(12) United States Patent
Tamura et al.

(10) Patent No.: US 6,582,564 B2
(45) Date of Patent: Jun. 24, 2003

(54) DISTILLATION APPARATUS AND DISTILLATION METHOD

(75) Inventors: Katsunori Tamura, Saitama (JP); Yoichi Harada, Tokyo (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/813,022

(22) Filed: Mar. 21, 2001

(65) Prior Publication Data

US 2002/0023830 A1 Feb. 28, 2002

(30) Foreign Application Priority Data

| Aug. 22, 2000 | (JP) | 2000-250777 |
| Aug. 30, 2000 | (JP) | 2000-260130 |
| Aug. 31, 2000 | (JP) | 2000-262185 |
| Sep. 12, 2000 | (JP) | 2000-275909 |

(51) Int. Cl.[7] ............... B01D 3/10; B01D 3/32
(52) U.S. Cl. ............ 202/153; 196/111; 196/114; 202/155; 202/158; 202/172; 202/205; 202/154; 202/186
(58) Field of Search ............ 202/154, 153, 202/155, 172, 158, 186, 205, 182; 196/111, 114

(56) References Cited

U.S. PATENT DOCUMENTS

| 2,698,282 A | * 12/1954 | Findlay ............ 196/77 |
| 3,477,915 A | * 11/1969 | Gantt et al. ............ 202/155 |
| 3,644,179 A | * 2/1972 | Knoer et al. ............ 202/153 |
| 4,141,799 A | 2/1979 | Thelen et al. |
| 4,323,431 A | 4/1982 | Takahashi et al. |
| 4,664,784 A | 5/1987 | Harandi |
| 5,935,388 A | * 8/1999 | Meszaros ............ 202/172 |
| 5,964,986 A | * 10/1999 | Meili ............ 202/155 |

FOREIGN PATENT DOCUMENTS

| EP | 0 684 060 A2 | 11/1995 |
| EP | 1 084 741 A1 | 3/2001 |
| GB | 710158 | 6/1954 |
| WO | WO99/56848 | 11/1999 |

OTHER PUBLICATIONS

Austrian Search Report for the corresponding Singapore application dated Aug. 8, 2001.
Abstract of Japanese Patent Publ. No. 09299701A; dated Nov. 25, 1997.
Abstract of Japanese Patent Publ. No. 09299702A; dated Nov. 25, 1997.

* cited by examiner

Primary Examiner—Virginia Manoharan
(74) Attorney, Agent, or Firm—Arent Fox Kintner Plotkin & Kahn, PLLC

(57) ABSTRACT

A distillation apparatus includes a column body; a partition for dividing the interior of the column body; a first distillation section composed of an enriching section and an exhaust section; a second distillation section composed of an enriching section formed above an upper end of the first distillation section, and an exhaust section located adjacent to the enriching section of the first distillation section; a third distillation section composed of an enriching section located adjacent to the exhaust section of the first distillation section, and an exhaust section formed below a lower end of the first distillation section; a condenser; a negative pressure generation system for generating a negative pressure to thereby withdraw vent gas; a gas cooler for cooling the vent gas; a first discharge system disposed at the side of the column body and adapted to discharge liquid rich in a medium-boiling-point component formed from a high-melting-point material; and a second discharge system disposed at the bottom of the column body and adapted to discharge liquid rich in a high-boiling-point component formed from a high-melting-point material. The first discharge system includes a first solidification prevention system for preventing solidification of the liquid rich in the medium-boiling-point component. The second discharge system includes a second solidification prevention system for preventing solidification of the liquid rich in the high-boiling-point component.

5 Claims, 22 Drawing Sheets

FIG. I
(PRIOR ART)

DISTILLATION APPARATUS AND DISTILLATION METHOD

BACKGROUND OF THE INVENTION

1. Field of the Invention

The present invention relates to a distillation apparatus and a distillation method.

2. Description of the Related Art

Conventionally, various kinds of distillation apparatus have been provided for separating, through distillation, a plurality of components contained in a material liquid in order to obtain predetermined components as products.

For example, in the case of a material liquid containing three components A, B, and C, in which component A is lower in boiling point than component B, and component B is lower in boiling point than component C; i.e., component A is a low-boiling-point component, component B is a medium-boiling-point component, and component C is a high-boiling-point component, the following distillation apparatus is used to separate components A to C of the material liquid through distillation.

FIG. 1 conceptually shows a conventional distillation apparatus.

In FIG. 1, reference numeral 201 denotes a first distillation column; reference numeral 202 denotes a second distillation column; reference numerals 203 and 205 denote evaporators; and reference numerals 204 and 206 denote condensers. The first distillation column 201 includes, from top to bottom, a first section 211, a second section 212, a third section 213, a fourth section 214, and a fifth section 215. An unillustrated packing element is disposed in each of the second section 212 and the fourth section 214, to thereby form an enriching section in the second section 212 and an exhaust section in the fourth section 214. The second distillation column 202 includes, from top to bottom, a first section 216, a second section 217, a third section 218, a fourth section 219, and a fifth section 220. An unillustrated packing element is disposed in each of the second section 217 and the fourth section 219, to thereby form an enriching section in the second section 217 and an exhaust section in the fourth section 219.

For example, when a material liquid M containing three components A, B, and C is fed into the third section 213 of the first distillation column 201, vapor rich in component A is discharged from the top of the first distillation column 201 and sent to the condenser 204, there the vapor is condensed into liquid rich in component A. The liquid rich in component A is discharged as distillate from the condenser 204. A portion of the distillate is refluxed as a refluxed liquid into the first distillation column 201, whereas the remaining distillate is discharged to an external destination.

Liquid rich in components B and C is discharged as a column-bottom liquid from the bottom of the first distillation column 201. A portion of the column-bottom liquid is sent to the evaporator 203, where the column-bottom liquid is evaporated through application of heat to become vapor rich in components B and C. The vapor rich in components B and C is returned to the first distillation column 201. The remaining column-bottom liquid is fed into the third section 218 of the second distillation column 202.

When the column-bottom liquid is fed into the third section 218, vapor rich in component B is discharged form the top of the second distillation column 202 and sent to the condenser 206, where the vapor is condensed into liquid rich in component B. The liquid rich in component B is discharged as distillate from the condenser 206. A portion of the distillate is refluxed into the second distillation column 202, whereas the remaining distillate is discharged to an external destination.

Liquid rich in component C is discharged as a column-bottom liquid from the bottom of the second distillation column 202. A portion of the column-bottom liquid is sent to the evaporator 205, where the column-bottom liquid is evaporated through application of heat to become vapor rich in component C. The vapor rich in component C is returned to the second distillation column 202. The remaining column-bottom liquid is discharged to an external destination.

Next will be described a distillation apparatus to be applied to the case where components B and C are high-melting-point materials.

FIG. 2 conceptually shows a conventional distillation apparatus to be applied to the case where a medium-boiling-point component and a high-boiling-point component are formed from respective high-melting-point materials.

In FIG. 2, symbol M denotes a material liquid containing three components A to C; reference numeral 201 denotes a first distillation column; reference numeral 202 denotes a second distillation column; reference numerals 203 and 205 denote evaporators; and reference numerals 204 and 206 denote condensers.

When the condenser 206 employs ordinary cooling water as cooling medium for cooling vapor rich in component B discharged from the top of the second distillation column 202, and the melting point of component B is higher than the temperature of cooling water (for example, the melting point of component B is higher than a cooling water temperature of 30° C. to 35° C.), vapor rich in component B cannot be condensed before the temperature of the vapor rises sufficiently high after operation of the distillation apparatus is started. During that period of time, the vapor solidifies within the condenser 206; thus, liquid rich in component B cannot be obtained as distillate.

In order to prevent the above-mentioned solidification of the vapor rich in component B within the condenser 206, a cooling system 225 connected to the condenser 206 uses a cooling medium heated to a temperature higher than the melting point of component B, such as hot water, cooling oil, or steam, until a predetermined period of time elapses after the operation of the distillation apparatus is started. Distillate is discharged from the condenser 206 to a line L11; a portion of the distillate is refluxed into the second distillation column 202 through a line L12; and the remaining distillate is discharged through a line L13. In order to prevent solidification of the distillate within the lines L11, L12, and L13, the lines L11 to L13 assume a double-pipe structure.

Liquid rich in component C, which serves as a column-bottom liquid, is discharged from the bottom of the second distillation column 202 to a line L15; a portion of the column-bottom liquid is sent to the evaporator 205 through a line L16; and the remaining column-bottom liquid is discharged through a line L17. In order to prevent solidification of the column-bottom liquid within the lines L15 to L17 when the temperature of component C is higher than ambient temperature, the lines L15 to L17 assume a double-pipe structure. The double-pipe structure includes an inner pipe and an outer pipe disposed concentrically. Steam serving as a heating medium is caused to flow through the space between the inner and outer pipes to thereby prevent solidification of the distillate or the column-bottom liquid flowing through the inner pipe.

In order to reduce energy consumed for heating the column-bottom liquids in the evaporators 203 and 205, preferably the evaporators 203 and 205 are lowered in temperature. However, when the evaporators 203 and 205 are lowered in temperature, evaporation of the column-bottom liquids becomes difficult accordingly. In order to cope with this problem, vacuum generators 227 and 228 are connected to the condensers 204 and 206, respectively, so as to establish a negative pressure within the first and second distillation columns 201 and 202. As a result, the column-bottom liquids can be readily evaporated. Also, vent gas generated within the first and second distillation columns 201 and 202 can be drawn out and released into the atmosphere.

However, when the condenser 206 and the vacuum generator 228 are directly connected, a portion of vapor rich in component B is mixed with the vent gas and sent from the condenser 206 to the vacuum generator 228. The vapor solidifies within the vacuum generator 228, breaking the vacuum generator 228. In order to cope with this problem, a vent gas treatment apparatus 230 is disposed between the condenser 206 and the vacuum generator 228 so as to remove the vapor rich in component B from the vent gas. The vent gas treatment apparatus 230 includes condensers 231 and 232 for separating the vent gas and the vapor from each other. Lines L21 to L23 for connecting the condenser 206 and the condensers 231 and 232, lines L24 to L26 for connecting the condensers 231 and 232 and the vacuum generator 228, and lines L27 to L29 for draining the condensers 231 and 232 assume a steam trace pipe structure.

However, employment of the above-mentioned auxiliary apparatus causes an increase in area occupied by the distillation apparatus and an increase in cost.

FIG. 3 is a view for explaining a conventional cooling system. Structural features similar to those in FIG. 2 are denoted by common reference numerals, and repeated description thereof is omitted.

Vapor rich in component B discharged from the second distillation column 202 is sent, through a line L31, to the condenser 206, where the vapor is condensed and discharged as a distillate to a line L11. In order to prevent solidification of the vapor within the condenser 206, hot water heated to a temperature higher than the melting point of component B is fed as a cooling medium to the condenser 206.

The cooling system 225 includes a hot water tank 235, a cooler 236, a pump 237, and valves 238 and 239. Before operation of the distillation apparatus is started, the valve 238 is opened so as to feed cooling water to the hot water tank 235 through an unillustrated line and a line L32 such that the hot water tank 235 stores cooling water by a volume required to start up the cooling system 225; ice., by a hold up volume. For a predetermined period of time after operation of the distillation apparatus is started, the valve 238 is held open to feed steam to the hot water tank 235 through the line L32.

Water contained in the hot water tank 235 is heated to a temperature higher than the melting point of component B by means of the steam. Thus-obtained hot water is sent to the cooler 236 via a line L36, the pump 237, and a line L35. The cooler 236 cools hot water to a predetermined temperature higher than the melting point of component B by means of low-temperature water. Thus-temperature-regulated hot water is fed to the condenser 206 through a line L34 and causes vapor rich in component B to be condensed within the condenser 206. In this manner, solidification of the vapor is prevented, and distillate having a temperature higher than the melting point of component B can be obtained. Hot water heated at the condenser 206 is sent to the hot water tank 235 through a line L33. The valve 238 is closed when the temperature of hot water contained in the hot water tank 235 is equal to or higher than a predetermined temperature; and the value 238 is opened when the temperature of hot water contained in the hot water tank 235 is lower than the predetermined temperature.

As mentioned above, the cooling system 225 requires the hot water tank 235 and the cooler 236, among other auxiliary apparatus, resulting in an increase in area occupied by the distillation apparatus as well as an increase in cost.

FIG. 4 is a view for explaining another conventional cooling system. Structural features similar to those in FIG. 3 are denoted by common reference numerals, and repeated description thereof is omitted.

In order to prevent solidification of vapor rich in component B within the condenser 206, cooling oil heated to a temperature higher than the melting point of component B is fed as a cooling medium to the condenser 206.

A cooling system 241 includes an oil tank 242, a cooler 236, a pump 237, and valves 238 and 239. Before operation of the distillation apparatus is started, the valve 238 is opened so as to feed cooling oil heated to a temperature higher than the melting point of component B to the oil tank 242 through a line L32 such that the oil tank 242 stores cooling oil by the hold up volume of the cooling system 241. Cooling oil is sent from the oil tank 242 to the cooler 236 via a line L36, the pump 237, and a line L35. The cooler 236 cools cooling oil to a predetermined temperature higher than the melting point of component B by means of low-temperature water. Thus-temperature-regulated cooling oil is fed to the condenser 206 through a line L34 and causes vapor rich in component B to be condensed within the condenser 206.

In the manner mentioned above, solidification of vapor rich in component B is prevented, and distillate having a temperature higher than the melting point of component B can be obtained. Cooling oil heated at the condenser 206 is sent to the oil tank 242 through a line L33. The valve 238 is closed when the temperature of cooling oil contained in the oil tank 242 is equal to or higher than a predetermined temperature; and the value 238 is opened when the temperature of cooling oil contained in the oil tank 242 is lower than the predetermined temperature.

As mentioned above, the cooling system 241 requires the cooler 236 and the oil tank 242, among other auxiliary apparatus, resulting in an increase in area occupied by the distillation apparatus as well as an increase in cost.

FIG. 5 is a view for explaining still another conventional cooling system.

In FIG. 5, reference numeral 252 denotes a second distillation column, and reference numeral 256 denotes a condenser disposed within the distillation column 252. In order to prevent solidification of vapor rich in component B within the condenser 256, hot water heated to a temperature higher than the melting point of component B is fed as a cooling medium to the condenser 256.

A cooling system 261 includes a hot water tank 262 and valves 263 to 266. For a predetermined period of time after operation of the distillation apparatus is started, the valve 263 is held open to feed steam to the hot water tank 262 through a line L41. In the hot water tank 262, steam and hot water are separated from each other. Hot water heated to a temperature higher than the melting point of component B is fed to the condenser 256 through a line L42 and causes vapor rich in component B to be condensed within the condenser 256. In this manner, solidification of the vapor is prevented, and distillate having a temperature higher than the melting point of component B can be obtained. Hot water (purified water) heated in the condenser 256 becomes pressurized hot water corresponding to the temperature of process steam within the condenser 256. Pressurized hot water is sent to the hot water tank 262 through a line L43. During the abovementioned operation, the valves 264 to 266 are held closed.

When the distillation apparatus enters steady-state operation, pressurized hot water fed to the hot water tank 262 is caused to separate into steam and hot water. Subsequently, the valve 263 is closed, and the valves 264 to 266 are opened. As a result, purified water is fed to the hot water tank 262 through a line L44, and hot water contained in the hot water tank 262 is fed to the condenser 256 through the line L42. Steam contained in the hot water tank 262 is discharged through a line L45 and the valve 265. Hot water contained in the hot water tank 262 is periodically blown out through a line L46 and the valve 266. Through practice of hot-water blow, the interior of the cooling system 261 is cleaned.

As mentioned above, the cooling system 261 requires the hot water tank 262 and the valves 263 to 266, among other auxiliary apparatus, resulting in an increase in area occupied by the distillation apparatus as well as an increase in cost.

FIG. 6 is a view for explaining a conventional vent gas treatment apparatus. Structural features similar to those in FIG. 2 are denoted by common reference numerals, and repeated description thereof is omitted.

A vent gas treatment apparatus 230 employs switching-condenser operation. The condenser 206 is accompanied by two condensers 231 and 232, which are disposed in parallel. One of the two condensers 231 and 232; for example, the condenser 231 is operated, while the other condenser 232 is on standby. Coolant is fed to the operating condenser 231 so as to cool vapor rich in component B mixed with vent gas to a temperature lower than the melting point of component B. The vapor is solidified to become a solid substance rich in component B within the condenser 231.

Solidification mentioned above causes reduction in the heat transfer area of the condenser 231. When the heat transfer area becomes smaller than a predetermined limit, the condenser 231 is brought on standby, and the condenser 232 is started. Compressed air is fed to the condenser 231 to thereby blow out coolant remaining in condenser tubes. Subsequently, steam is fed to the condenser 231 to thereby melt the solid substance rich in component B formed within the condenser 231 into liquid rich in component B. The liquid is discharged through a line L28. Steam is condensed to become condensate, which is discharged from the condenser 231. After the liquid rich in component B is discharged from the condenser 231, coolant is fed to the condenser 231 so as to precool the same.

As mentioned above, the vent gas treatment apparatus 230 requires the condensers 231 and 232, among other auxiliary apparatus, resulting in an increase in area occupied by the distillation apparatus as well as an increase in cost.

FIG. 7 is a view for explaining another conventional vent gas treatment apparatus.

The condenser 206 and a vent gas treatment apparatus 270 are connected by means of a line L71. The vacuum generator 228 and the vent gas treatment apparatus 270 are connected by means of a line L74. The vent gas treatment apparatus 270 employs vent scrubber operation. The vent gas treatment apparatus 270 includes a vent scrubber 271; a pump 273; a heat exchanges 274; and valves 275 and 276. The vent scrubber 271 includes a still section 281 and a packing column section 282.

Solution for adsorbing vent gas and vapor rich in component B is circulated by means of the pump 273. Specifically, the solution discharged from the still section 281 to a line L72 is sent, through a line L73, to the heat exchanger 274 by means of the pump 273. The solution discharged from the heat exchanger 274 is fed to the packing column section 282 through a line L77. The thus-fed solution is sprayed from the top of the packing column section 282 and descends within the packing column section 282. Vent gas is fed to the still section 281 through the line L71 and ascends within the packing column section 282 to thereby be adsorbed by the solution. The solution which has adsorbed vent gas is discharged to the line L72 and is then sent to an unillustrated treatment apparatus through a line L75 at predetermined timing. A line L76 is used to replenish the vent gas treatment apparatus 270 with the solution. The solution has properties capable of sufficiently adsorbing vapor rich in component B having high melting point.

As mentioned above, the vent gas treatment apparatus 270 requires the vent scrubber 271 and the heat exchanger 274, among other auxiliary apparatus, resulting in an increase in area occupied by the distillation apparatus as well as an increase in cost. Furthermore, the solution must has properties capable of sufficiently adsorbing vapor rich in component B having high melting point, thus boosting distillation cost.

A distillation apparatus embodied through modification of the distillation apparatus of FIG. 1 has been provided. The distillation apparatus is configured in the following manner. The top of the first distillation column 201 is connected to the side of the second distillation column 202. In the first distillation column 201, component C is separated from components A and B. In the second distillation column 202, component A and component B are separated from each other to thereby collect component B as a product.

FIG. 8 conceptually shows a conventional distillation apparatus in which a medium-boiling-point component is collected at the bottom of a second distillation column. Structural features similar to those in FIG. 1 are denoted by common reference numerals and repeated description thereof is omitted.

For example, when a material liquid M containing three components A, B, and C is fed into the third section 213 of the first distillation column 201, vapor rich in components A and B is discharged from the top of the first distillation column 201 and sent to the condenser 204, where the vapor is condensed into liquid rich in components A and B. The liquid rich in components A and B is discharged as distillate from the condenser 204. A portion of the distillate is refluxed into the first distillation column 201, whereas the remaining distillate is fed into the third section 218 of the second distillation column 202.

Liquid rich in component C is discharged as a column-bottom liquid from the bottom of the first distillation column 201. A portion of the column-bottom liquid is sent to the evaporator 203, where the column-bottom liquid is evaporated through application of heat to become vapor rich in component C. The vapor rich in component C is returned to the first distillation column 201. The remaining column-bottom liquid is discharged to an external destination.

When the distillate is fed into the third section 218, vapor rich in component A is discharged from the top of the second distillation column 202 and sent to the condenser 206, where the vapor is condensed into liquid rich in component A. The liquid rich in component A is discharged as distillate from the condenser 206. A portion of the distillate is refluxed into the second distillation column 202, whereas the remaining distillate is discharged to an external destination.

Liquid rich in component B is discharged as a column-bottom liquid from the bottom of the second distillation column 202. A portion of the column-bottom liquid is sent to the evaporator 205, where the column-bottom liquid is evaporated through application of heat to become vapor rich in component B. The vapor rich in component B is returned to the second distillation column 202. The remaining column-bottom liquid is discharged to an external destination.

When separation of component C is insufficient in the first distillation column 201, component C gathers as an impurity in the vicinity of the bottom of the second distillation column 202. When components B and C are heated in the evaporators 203 and 205, respectively, components B and C are decomposed to form modified components B' and C' having a high boiling point. Thus, modified components B' and C' also gather as impurities in the vicinity of the bottom of the second distillation column 202. As a result, component B collected as a product contains impurities, such as component C and modified components B' and C'.

Component C and modified components B' and C' have large molecular mass of carbon and thus affect hue and odor of the product.

Since the product is collected at the bottom of the second distillation column 202, the product is exposed to high temperature induced by the evaporator 205 disposed at the column bottom. As a result, component B, which is a product, is decomposed to form modified component B' having a high boiling point, with a resultant impairment in product quality.

In order to cope with the above problem, there is provided a distillation apparatus which collects a product in the form of vapor, not in the form of liquid.

FIG. 9 conceptually shows a conventional distillation apparatus which collects a product in the form of vapor. Structural features similar to those in FIG. 8 are denoted by common reference numerals, and repeated description thereof is omitted.

A second distillation column 202 includes, from top to bottom, a first section 216, a second section 217, a third section 218, a fourth section 219, a fifth section 331, a sixth section 332, and a seventh section 333. A packing element is disposed in each of the second section 217 and the fourth section 219, to thereby form an enriching section in the second section 217 and an exhaust section in the fourth section 219. A demister is disposed in the sixth section 332.

Vapor rich in component B is collected as a product from the fifth section 331 and fed to a condenser 336 via a valve 335. In the condenser 336, the vapor is condensed into liquid rich in component B. The liquid rich in component B is discharged from the condenser 336 as a column-bottom liquid. The liquid is fed to a receiver 337 and accumulated therein. The liquid is then discharged from the receiver 337.

In order to carry out distillation in a low-temperature region for prevention of impairment in product quality and to reduce energy consumed for heating a portion of a column-bottom liquid in evaporators 203 and 205, a vacuum generator 338 is disposed for use with the condensers 204 and 206, and a vacuum generator 339 is disposed for use with the condenser 336. The vacuum generators 338 and 339 generate a negative pressure within the first and second distillation columns 201 and 202. Thus, the column-bottom liquids can be readily evaporated. Also, vent gas generated within the first and second distillation columns 201 and 202 can be drawn out and released into the atmosphere.

Even though impurities gather in the vicinity of the bottom of the second distillation column 202, vapor rich in component B is not collected from the bottom of the second distillation column 202, but is collected as a product from the fifth section 331. Thus, the product does not contain impurities; therefore, the hue and odor of the product are not affected. The product is collected from the fifth section 331; i.e., the product is not exposed to high temperature induced by the evaporator 205 disposed at the column bottom, thereby enhancing product quality. Impurities gathering in the vicinity of the bottom of the second distillation column 202 are discharged through a line L240.

There has been provided a distillation apparatus in which a product is collected in the form of liquid, and impurities are removed from the product.

FIG. 10 conceptually shows a conventional distillation apparatus in which impurities are removed from a product. Structural features similar to those in FIGS. 8 and 9 are denoted by common reference numerals, and repeated description thereof is omitted.

Liquid rich in component B is collected from the fifth section 220 as a column-bottom liquid and as a product and fed to a receiver 342 via a valve 341. The receiver 342 and a heater 344 are connected. The product fed to the receiver 342 is then fed to the heater 344, where the product is evaporated to become vapor rich in component B. In the heater 344, the vapor rich in component B is separated from impurities, such as component C and modified components B' and C'. The vapor rich in component B, which is free of impurities, is returned to the receiver 342.

Subsequently, the vapor rich in component B is fed to a condenser 343 for use with a product. In the condenser 343, the vapor is condensed into liquid rich in component B. The liquid rich in component B is discharged from the condenser 343. The liquid is fed to a receiver 345 and accumulated therein. Then, the liquid is discharged from the receiver 345 and sent to an external destination via a valve 346. In the course of operation mentioned above, impurities are accumulated within the receiver 342. Thus, when the operation is performed for a predetermined period of time, the impurities are removed through a line L248. Reference numeral 347 denotes a vacuum generator.

The above-mentioned conventional distillation apparatus adapted to collect a product in the form of vapor requires the valve 335, the condenser 336, and the receiver 337, among other auxiliary apparatus. The above-mentioned conventional distillation apparatus adapted to collect a product in the form of liquid and adapted to remove impurities from the product requires the valves 341 and 346, the receivers 342 and 345, the condenser 343, and the heater 344, among other auxiliary apparatus. Thus, the size and cost of the distillation apparatus increase.

Also, the distillation apparatus require complicated equipment for controlling and maintaining the same. In particular, in the case of the distillation apparatus adapted to collect a product in the form of vapor, the flow rate of vapor discharged from the fifth section 331 must be regulated by means of the valve 335. However, since control of vapor is very complicated, involvement of vapor control pushes up the cost of the distillation apparatus.

SUMMARY OF THE INVENTION

An object of the present invention is to solve the above-mentioned problems in the conventional distillation apparatus and to provide a distillation apparatus which allows a reduction in area occupied thereby and which can be manufactured and operated at low cost, as well as to provide a distillation method employing the distillation apparatus.

Another object of the present invention is to provide a distillation apparatus enabling removal of impurities from a product to thereby prevent adverse effect on hue and odor of the product which would otherwise result from the impurities, as well as to provide a distillation method employing the distillation apparatus.

To achieve the above objects, the present invention provides a distillation apparatus comprising a column body; a partition for dividing the interior of the column body into a first chamber and a second chamber, which are adjacent to each other; a first distillation section having an enriching section, to which a material liquid is fed through a feed nozzle and which is formed above the feed nozzle, and an exhaust section formed under the feed nozzle; a second distillation section having an enriching section connected to and formed above an upper end of the first distillation section, and an exhaust section formed below the upper end and located adjacent to the enriching section of the first distillation section while being separated from the same by the partition; a third distillation section having an enriching section connected to and formed above a lower end of the first distillation section, and located adjacent to the exhaust section of the first distillation section while being separated from the same by the partition, and an exhaust section formed below the lower end; a condenser connected to the top of the column body and adapted to condense vapor rich in a low-boiling-point component discharged at the top; negative-pressure generation means connected to the condenser and adapted to generate a negative pressure to thereby withdraw vent gas from the column body; a gas cooler for cooling the vent gas disposed between the condenser and the negative-pressure generation means; a first discharge system disposed at the side of the column body and adapted to discharge liquid rich in a medium-boiling-point component formed from a high-melting-point material; and a second discharge system disposed at the bottom of the column body and adapted to discharge liquid rich in a high-boiling-point component formed from a high-melting-point material.

The first discharge system has first solidification prevention means for preventing solidification of the liquid rich in the medium-boiling-point component. The second discharge system has second solidification prevention means for preventing solidification of the liquid rich in the high-boiling-point component.

In this case, the vapor rich in the low-boiling-point component is discharged at the top of the column body, and the low-boiling-point component is formed from a low-melting-point material. Thus, there is no need to employ various auxiliary apparatus such as a hot water tank, a cooler, an oil tank, a condenser, and a vent scrubber.

Thus, the distillation apparatus allows a reduction in area occupied thereby and can be manufactured and operated at low cost.

Preferably, the first and second solidification prevention means each assume a double-pipe structure comprising an inner pipe and an outer pipe disposed concentrically and in which a heating medium is caused to flow through the space between the inner and outer pipes to thereby prevent solidification of the liquid flowing through the inner pipe.

Further preferably, the first and second solidification prevention means are each steam tracing comprising a primary pipe and a secondary pipe disposed in parallel and in which a heating medium is caused to flow through the secondary pipe to thereby prevent solidification of the liquid flowing through the primary pipe.

The present invention provides another distillation apparatus comprising a column body; a partition for dividing the interior of the column body into a first chamber and a second chamber, which are adjacent to each other; a first distillation section having an enriching section, to which a material liquid containing a low-boiling-point component, a medium-boiling-point component, and a high-boiling-point component is fed through a feed nozzle and which is formed above the feed nozzle, and an exhaust section formed under the feed nozzle; a second distillation section having an enriching section connected to and formed above an upper end of the first distillation section, and an exhaust section formed below the upper end and located adjacent to the enriching section of the first distillation section while being separated from the same by the partition; a third distillation section having an enriching section connected to and formed above a lower end of the first distillation section, and located adjacent to the exhaust section of the first distillation section while being separated from the same by the partition, and an exhaust section formed below the lower end; a condenser connected to the top of the column body and adapted to condense vapor rich in a low-boiling-point component discharged at the top; a side cut nozzle disposed at the side of the column body and adapted to discharge liquid rich in the medium-boiling-point component as a product at the side; an evaporator disposed at the bottom of the column body and adapted to generate vapor through application of heat to liquid rich in a high-boiling-point component discharged at the bottom; and a cooler connected to the side cut nozzle and adapted to cool the product.

In this case, the liquid rich in the medium-boiling-point component is enriched in the exhaust section of the second distillation section and discharged as a product at the side of the column body. The liquid rich in the high-boiling-point component is enriched in the exhaust section of the first distillation section and in the enriching section of the third distillation section. The thus-enriched liquid rich in the high-boiling-point component is further enriched in the exhaust section of the third distillation section and is then discharged at the bottom of the column body. A modified component formed through decomposition of the medium-boiling-point component is collected in the vicinity of the bottom of the column body and is then discharged at the column bottom.

Accordingly, the medium-boiling-point component does not contact the high-boiling-point component and the modified component while these components are in the form of liquid. Thus, the medium-boiling-point component collected as a product does not contain the high-boiling-point component and the modified component, which are impurities. As a result, the hue and odor of the product are not affected.

Also, entry of impurities into a product can be prevented without use of auxiliary apparatus such as a valve, a product condenser, a receiver, and a heater, thereby reducing the size of the distillation apparatus and the cost of manufacture and operation of the distillation apparatus. Furthermore, there can be simplified equipment for controlling the operation of the distillation apparatus and maintaining the distillation apparatus. Since a product can be collected in the form of liquid, flow rate control of the product can be significantly simplified, thereby reducing the cost of manufacture and operation of the distillation apparatus.

Since a product is collected at the side of the column body, the product is not exposed to high temperature induced by the evaporator disposed at the bottom of the column body. Also, the product does not require additional heating by a heater. Thus, formation of a modified component within the product can be prevented, thereby enhancing product quality.

The product collected at the side of the column body is immediately cooled by the cooler, thereby preventing decomposition of the medium-boiling-point component which would otherwise result from heat held by the product itself. Formation of a modified component within the product can be prevented more reliably.

The present invention provides a further distillation apparatus comprising: a column body; a partition for dividing the interior of the column body into a first chamber and a second chamber, which are adjacent to each other; a first distillation section having an enriching section, to which an adjusted material liquid comprising a material liquid and an additive component is fed through a feed nozzle and which is formed above the feed nozzle, and an exhaust section formed under the feed nozzle; a second distillation section having an enriching section connected to and formed above an upper end of the first distillation section, and an exhaust section formed below the upper end and located adjacent to the enriching section of the first distillation section while being separated from the same by the partition; a third distillation section having an enriching section connected to and formed above a lower end of the first distillation sections and located adjacent to the exhaust section of the first distillation section while being separated from the same by the partition: and an exhaust section formed below the lower end; a condenser disposed at the top of the column body and adapted to condense vapor rich in the additive component into liquid rich in the additive component and to discharge the liquid rich in the additive component as distillate; a first discharge system disposed at the side of the column body and adapted to discharge liquid rich in a low-boiling-point component formed from a high-melting-point material; and a second discharge system disposed at the bottom of the column body and adapted to discharge liquid rich in a high-boiling-point component.

The boiling point of the additive component is lower than that of the low-boiling-point component.

In this case, the adjusted material liquid is obtained through addition, to a material liquid, of an additive component lower in boiling point than the low-boiling-point component. The adjusted material liquid is fed to the first distillation section through the feed nozzle. Thus, vapor rich in the additive component is discharged from the top of the column body. There is no need to collect the low-boiling-point component as a product at the top of the column body. Vapor rich in the additive component is condensed by means of the condenser; i.e., there is no need to condense vapor rich in the low-boiling-point component by means of the condenser.

Thus, there is no need to employ various auxiliary apparatus such as a hot water tank, a cooler, an oil tank, a condenser, a vent scrubber, and a heat exchanger, thereby reducing the size of the distillation apparatus and the cost of manufacture and operation of the distillation apparatus.

Preferably, a portion of the distillate is refluxed into the column body, and the remaining distillate is added as an additive component to the material liquid.

In this case, the additive component can be repeatedly used through addition to the material liquid, thereby reducing the cost of operation of the distillation apparatus.

Further preferably, a portion of the distillate is refluxed into the column body; the remaining distillate is discharged; and an additive component is added for, replenishment in an amount corresponding to the amount of the distillate to be discharged.

Still further preferably, all of the distillate is refluxed into the column body; and in order to start operation of the distillation apparatus, an additive component is added in a predetermined amount to the material liquid.

Still further preferably: the distillation apparatus further comprises negative-pressure generation means connected to the condenser and adapted to generate a negative pressure to thereby withdraw vent gas from the column body; and a gas cooler for cooling the vent gas disposed between the condenser and the negative-pressure generation means.

Still further preferably, the first discharge system has solidification prevention means for preventing solidification of the liquid rich in the low-boiling-point component.

The present invention provides a distillation method applicable to a distillation apparatus comprising a column body; a partition for dividing the interior of the column body into a first chamber and a second chamber, which are adjacent to each other; a first distillation section having an enriching section formed above a feed nozzle, and an exhaust section formed under the feed nozzle; a second distillation section having an enriching section connected to and formed above an upper end of the first distillation section, and an exhaust section formed below the upper end and located adjacent to the enriching section of the first distillation section while being separated from the same by the partition; and a third distillation section having an enriching section connected to and formed above a lower end of the first distillation section, and located adjacent to the exhaust section of the first distillation section while being separated from the same by the partition, and an exhaust section formed below the lower end.

The distillation method comprises the steps of feeding an adjusted material liquid comprising a material liquid and an additive component to the first distillation section through the feed nozzle; condensing vapor rich in the additive component into liquid rich in the additive component at the top of the column body; discharging the liquid rich in the additive component as distillate; discharging liquid rich in a low-boiling-point component formed from a high-melting-point material at the side of the column body; and discharging liquid rich in a high-boiling-point component at the bottom of the column body.

The boiling point of the additive component is lower than that of the low-boiling-point component.

The present invention provides a further distillation apparatus comprising a column body; a partition for dividing the interior of the column body into a first chamber and a second chamber, which are adjacent to each other; a first distillation section having an enriching section, to which an adjusted material liquid comprising a material liquid and an additive component is fed through a feed nozzle and which is formed above the feed nozzle, and an exhaust section formed under the feed nozzle; a second distillation section having an enriching section connected to and formed above an upper end of the first distillation section, and an exhaust section formed below the upper end and located adjacent to the enriching section of the first distillation section while being separated from the same by the partition; a third distillation section having an enriching section connected to and formed above a lower end of the first distillation section, and located adjacent to the exhaust section of the first distillation section while being separated from the same by the partition, and an exhaust section formed below the lower end; a condenser disposed at the top of the column body and adapted to condense vapor rich in a low-boiling-point component into liquid rich in the low-boiling-point component and to discharge the liquid rich in the low-boiling-point; a first discharge system disposed at the side of the column body and adapted to discharge liquid rich in a high-boiling-point component; a second discharge system disposed at the bottom of the column body and adapted to discharge liquid rich in the additive component as a column-bottom liquid; and an evaporator for evaporating the column-bottom liquid to thereby obtain vapor rich in the additive component.

The boiling point of the additive component is higher than that of the high-boiling-point component.

In this case, since a modified component formed through decomposition of the high-boiling point component gathers in the vicinity of the bottom of the column body, the modified component and the high-boiling-point component do not contact each other while these components are in the form of liquid. Thus, the product to be collected does not contain the modified component, which is an impurity. As a result, the hue and odor of the product are not affected.

Also, entry of impurities into a product can be prevented without use of auxiliary apparatus such as a valve, a product condenser, a receiver and a heater, thereby reducing the size of the distillation apparatus and the cost of manufacture and operation of the distillation apparatus. Furthermore, there can be simplified equipment for controlling the operation of the distillation apparatus and maintaining the distillation apparatus. Since a product can be collected in the form of liquid, flow rate control of the product can be significantly simplified, thereby reducing the cost of manufacture and operation of the distillation apparatus.

Since a product is collected at the side of the column body, the product is not exposed to high temperature induced by the evaporator disposed in the vicinity of the bottom of the column body. Also, the product does not require additional heating by a heater. Thus, formation of a modified component, which becomes an impurity, within the product can be prevented, thereby enhancing product quality.

Preferably, a portion of the column-bottom liquid is fed to the evaporator; and the remaining column-bottom liquid is added as an additive component to the material liquid.

In this case, the additive component can be repeatedly used through addition to the material liquid, thereby reducing the cost of operation of the distillation apparatus.

Further preferably, most of the column-bottom liquid is fed to the evaporator; the remaining column-bottom liquid is discharged; and an additive component is added for replenishment in an amount corresponding to the amount of the column-bottom liquid to be discharged.

Still further preferably, all of the column-bottom liquid is fed to the evaporator; and in order to start operation of the distillation apparatus, an additive component is added in a predetermined amount to the material liquid.

Still further preferably, the first discharge system has cooling means for cooling the liquid rich in the high-boiling-point component.

In this case, the product collected at the side of the column body is immediately cooled by the cooling means, thereby preventing decomposition of the high-boiling-point component which would otherwise result from heat held by the product itself. Formation of a modified component within the product can be prevented.

The present invention provides another distillation method applicable to a distillation apparatus comprising a column body; a partition for dividing the interior of the column body into a first chamber and a second chamber, which are adjacent to each other; a first distillation section having an enriching section formed above a feed nozzle, and an exhaust section formed under the feed nozzle; a second distillation section having an enriching section connected to and formed above an upper end of the first distillation section, and an exhaust section formed below the upper end and located adjacent to the enriching section of the first distillation section while being separated from the same by the partition; and a third distillation section having an enriching section connected to and formed above a lower end of the first distillation section, and located adjacent to the exhaust section of the first distillation section while being separated from the same by the partition, and an exhaust section formed below the lower end.

The distillation method comprises the steps of feeding an adjusted material liquid comprising a material liquid and an additive component to the first distillation section through the feed nozzle; condensing vapor rich in a low-boiling-point component into liquid rich in the low-boiling-point component at the top of the column body; discharging the liquid rich in the low-boiling-point component at the top of the column body; discharging liquid rich in a high-boiling-point component at the side of the column body; discharging liquid rich in the additive component as a column-bottom liquid at the bottom of the column body; and evaporating the column-bottom liquid to thereby obtain vapor rich in the additive component.

The boiling point of the additive component is higher than that of the high-boiling-point component.

BRIEF DESCRIPTION OF THE DRAWINGS

The structure and features of the distillation apparatus and method according to the present invention will be readily appreciated as the same becomes better understood by referring to the drawings, in which.

DESCRIPTION OF THE PREFERRED EMBODIMENTS

Embodiments of the present invention will next be described in detail with reference to the drawings.

Figure 1:
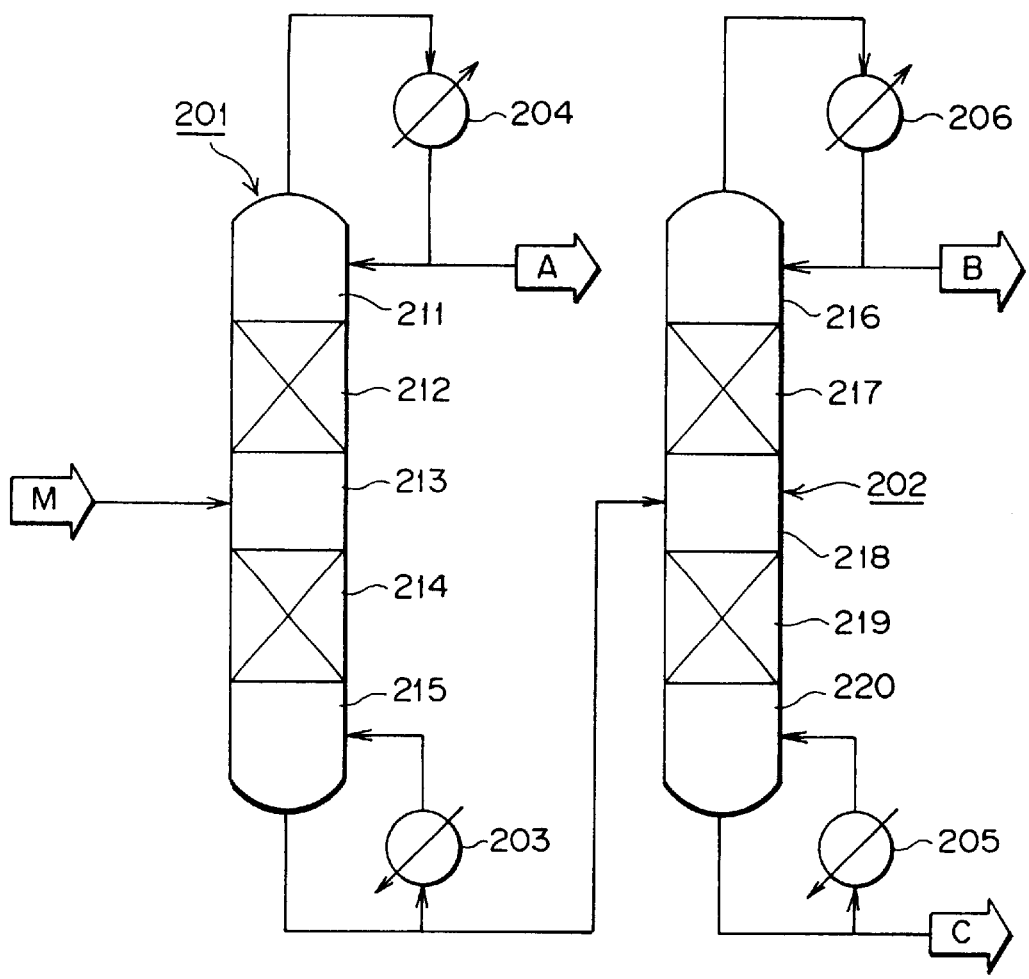
FIG. 1 is a conceptual view of a conventional distillation apparatus.
Figure 2:
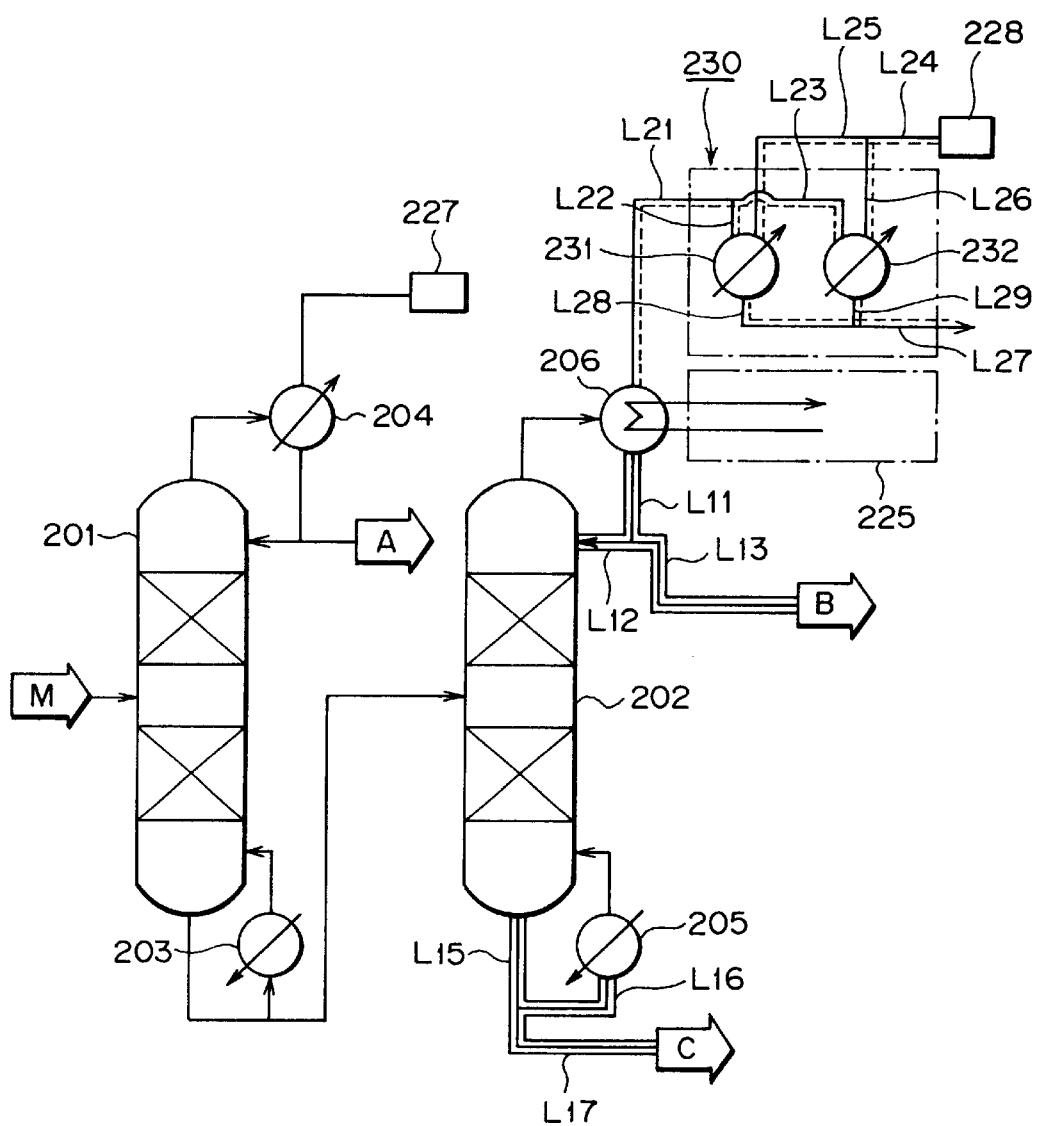
FIG. 2 is a conceptual view of a conventional distillation apparatus to be applied to the case where a medium-boiling-point component and a high-boiling-point component are formed from respective high-melting-point materials.
Figure 3:
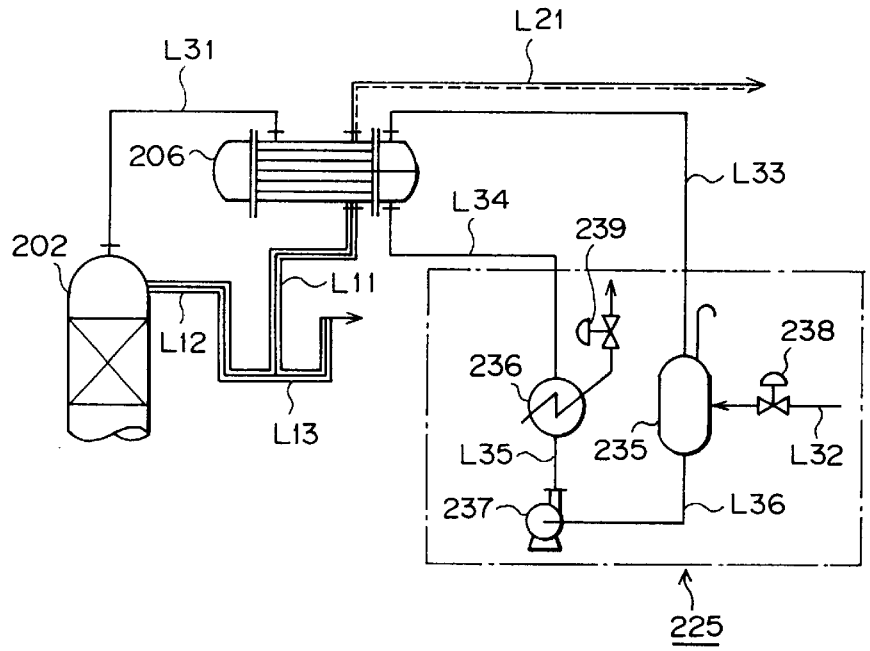
FIG. 3 is a view for explaining a conventional cooling system.
Figure 4:
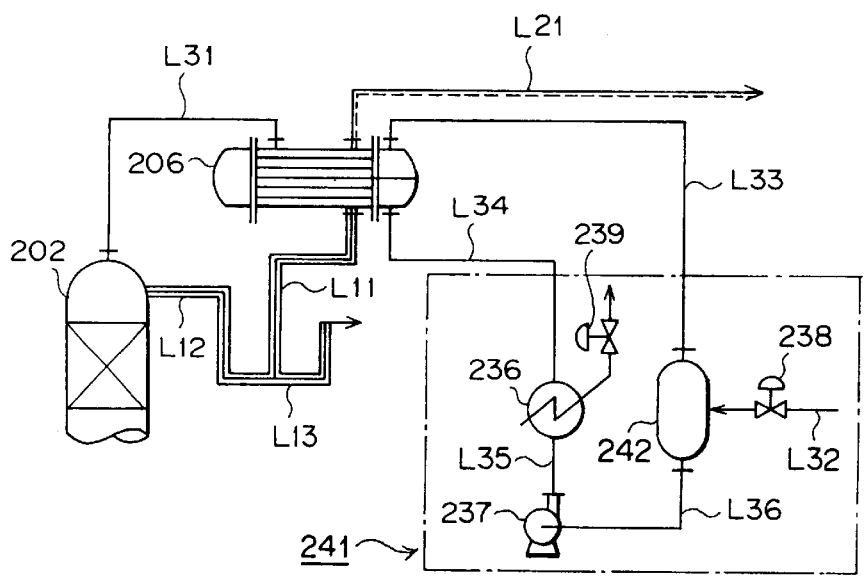
FIG. 4 is a view for explaining another conventional cooling system.
Figure 5:
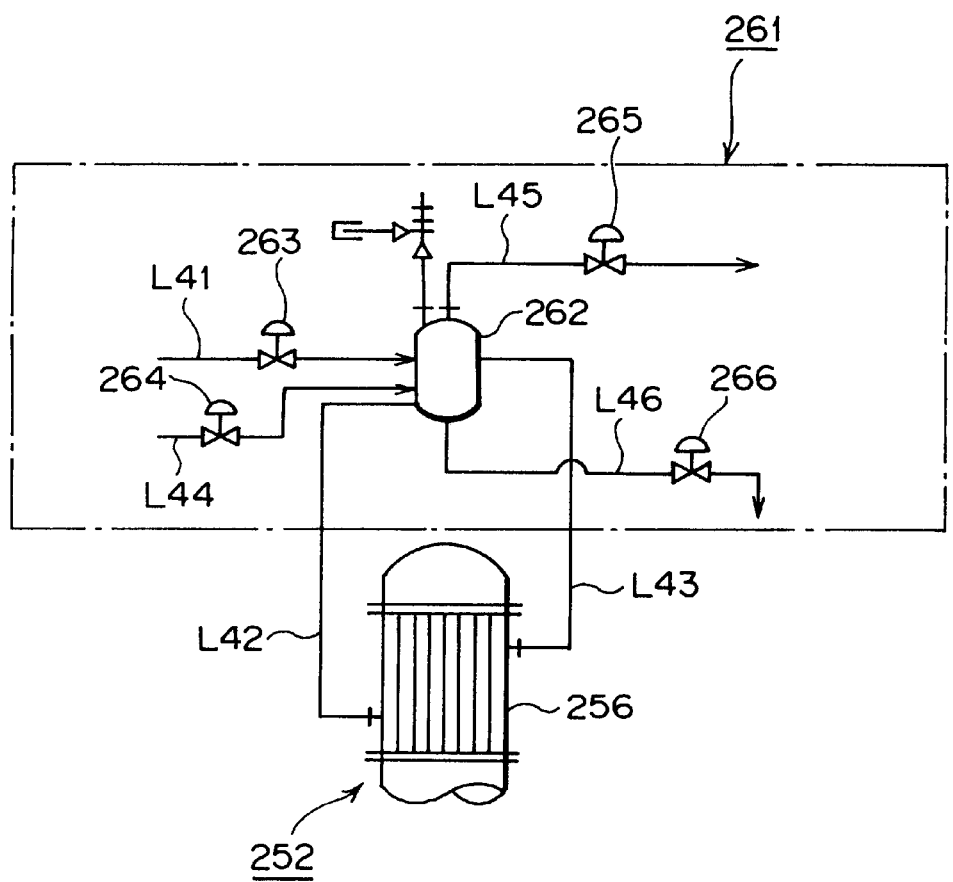
FIG. 5 is a view for explaining still another conventional cooling system.
Figure 6:
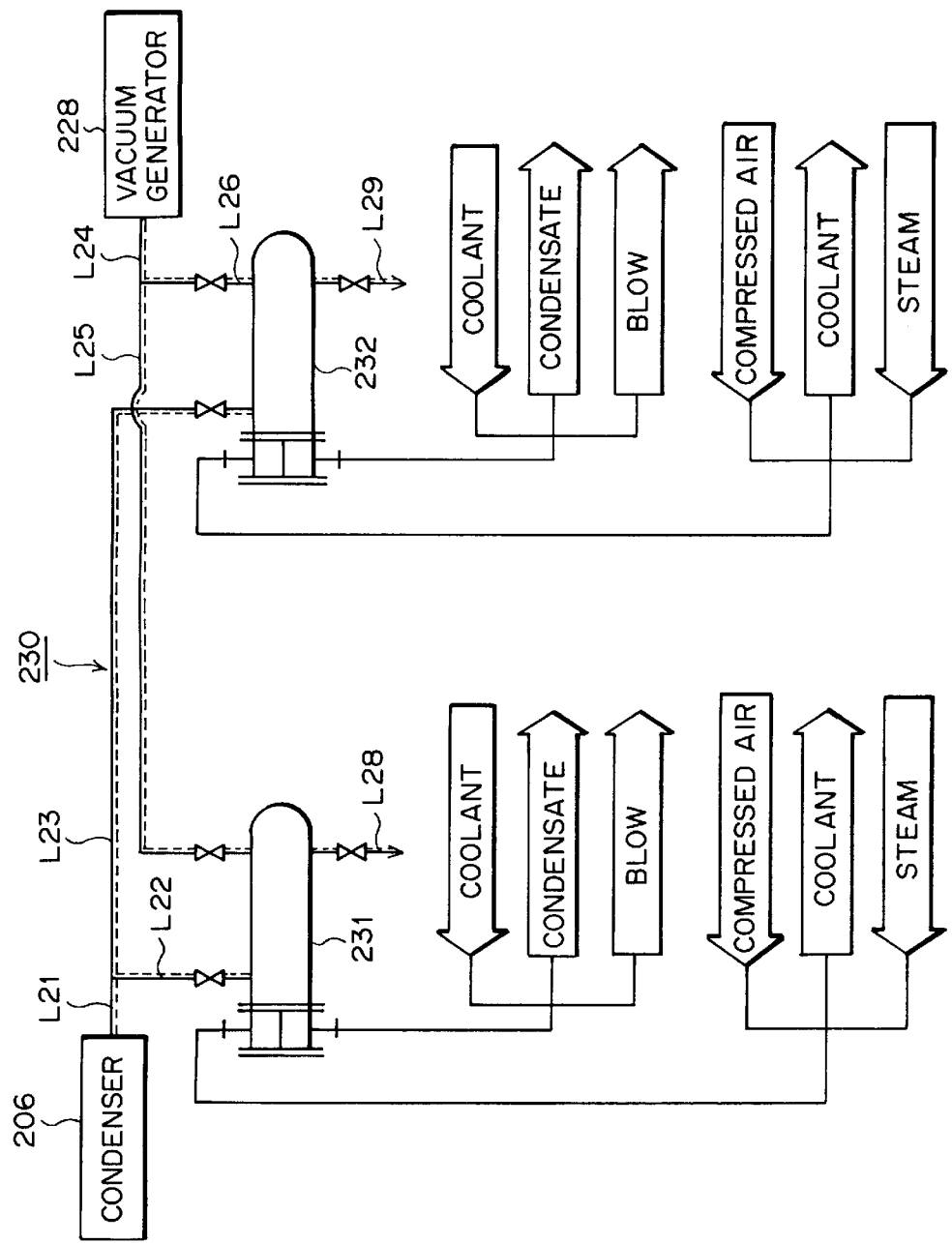
FIG. 6 is a view for explaining a conventional vent gas treatment apparatus.
Figure 7:
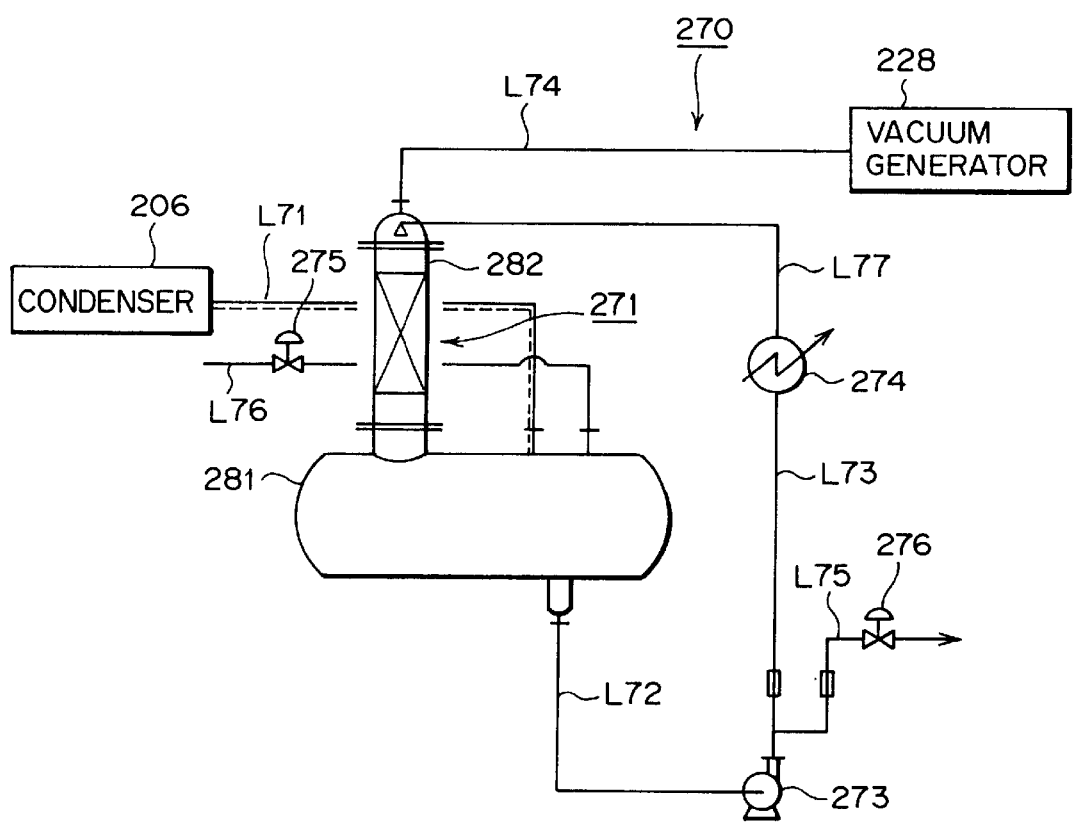
FIG. 7 is a view for explaining another conventional vent gas treatment apparatus.
Figure 8:
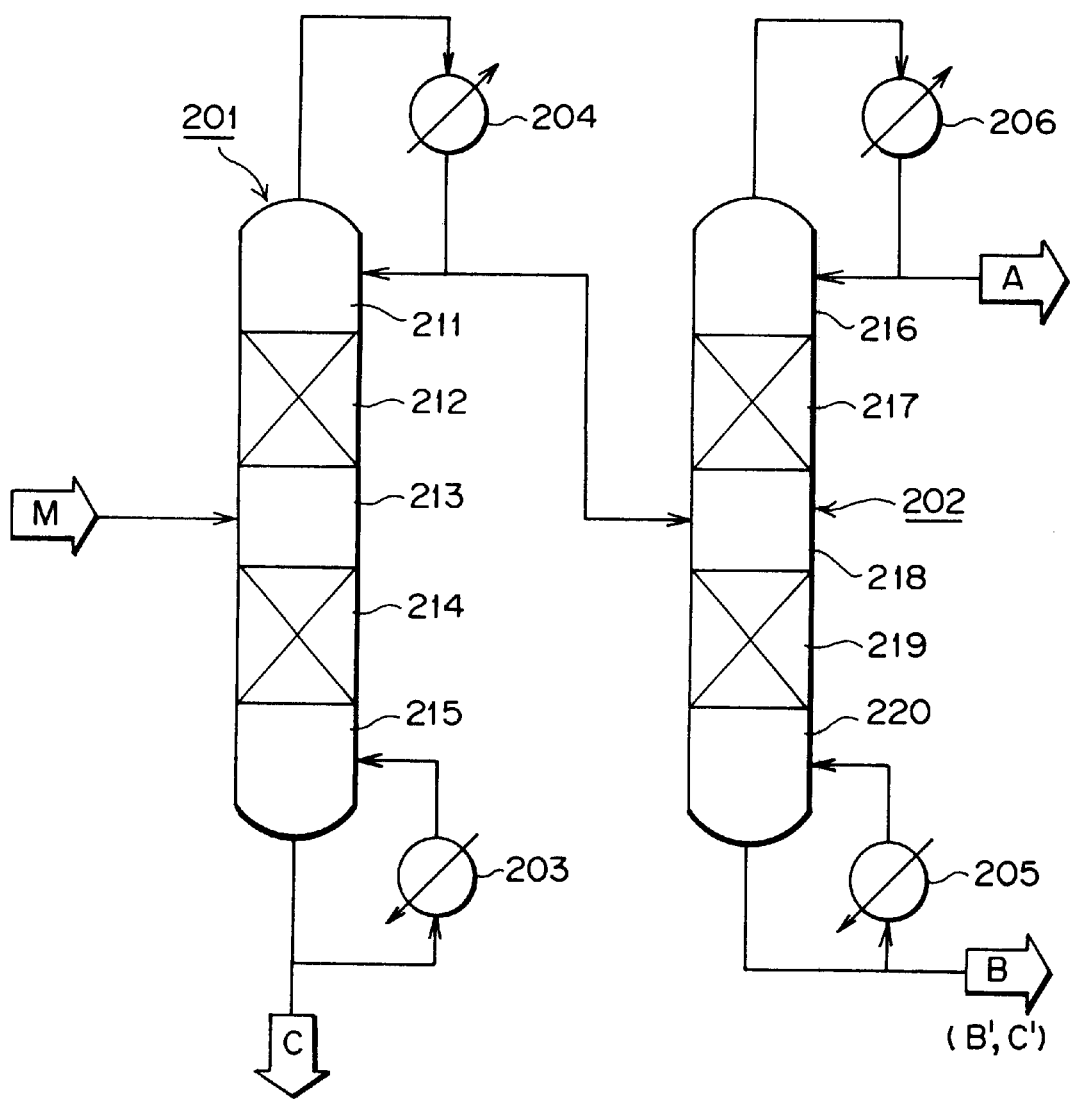
FIG. 8 is a conceptual view of a conventional distillation apparatus in which a medium-boiling-point component is collected at the bottom of a second distillation column.
Figure 9:
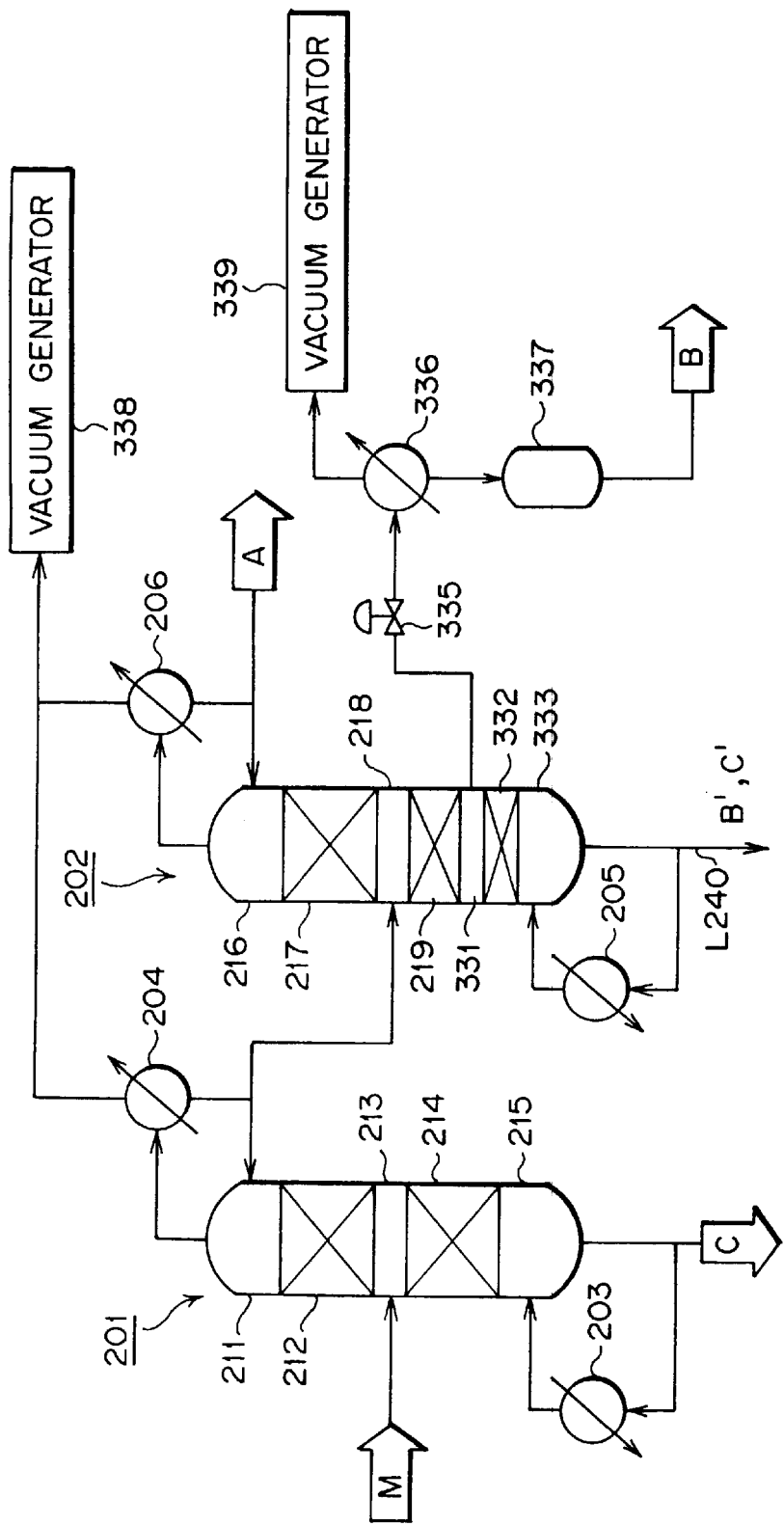
FIG. 9 is a conceptual view of a conventional distillation apparatus which collects a product in the form of vapor.
Figure 10:
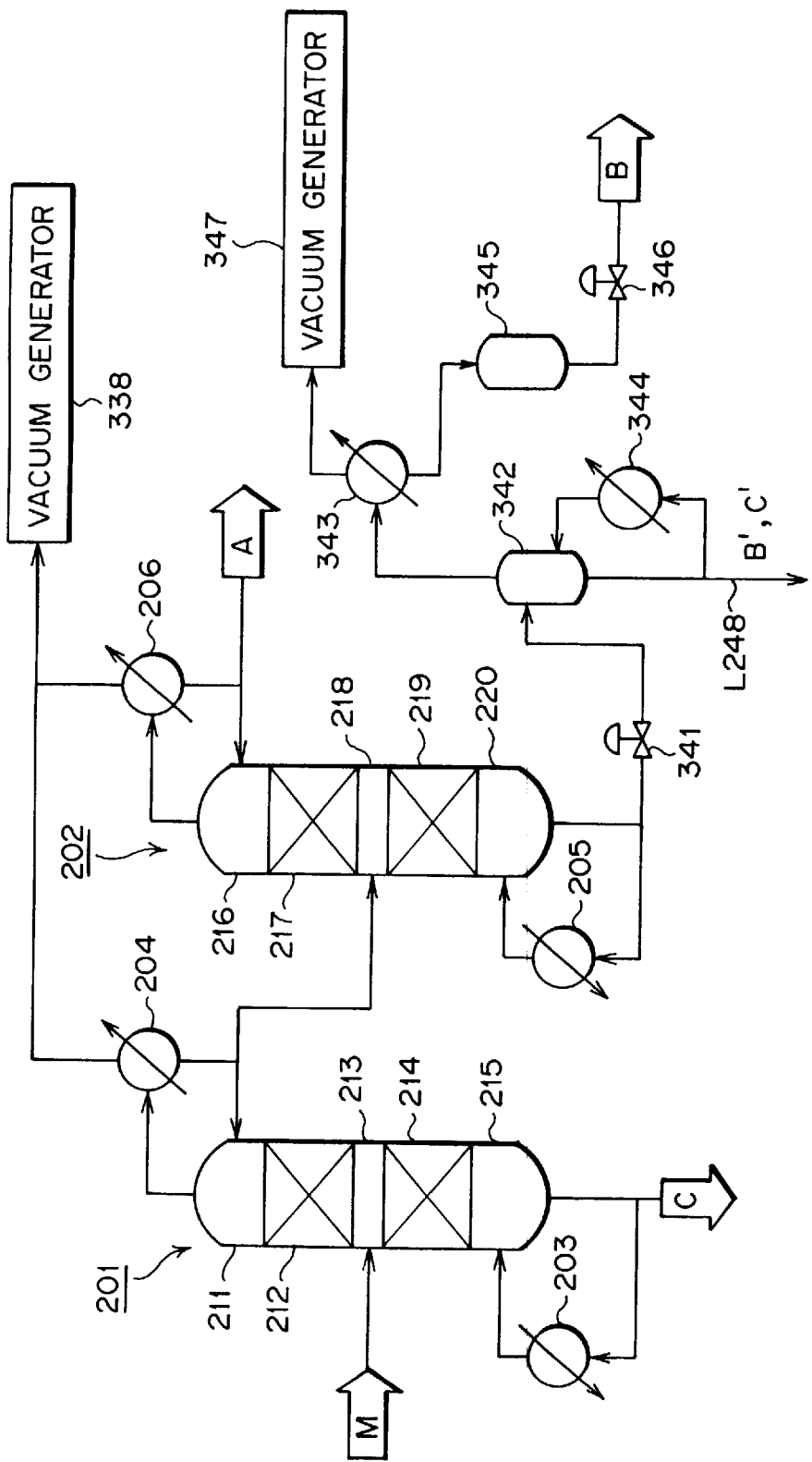
FIG. 10 is a conceptual view of a conventional distillation apparatus in which impurities are removed from a product.
Figure 11:
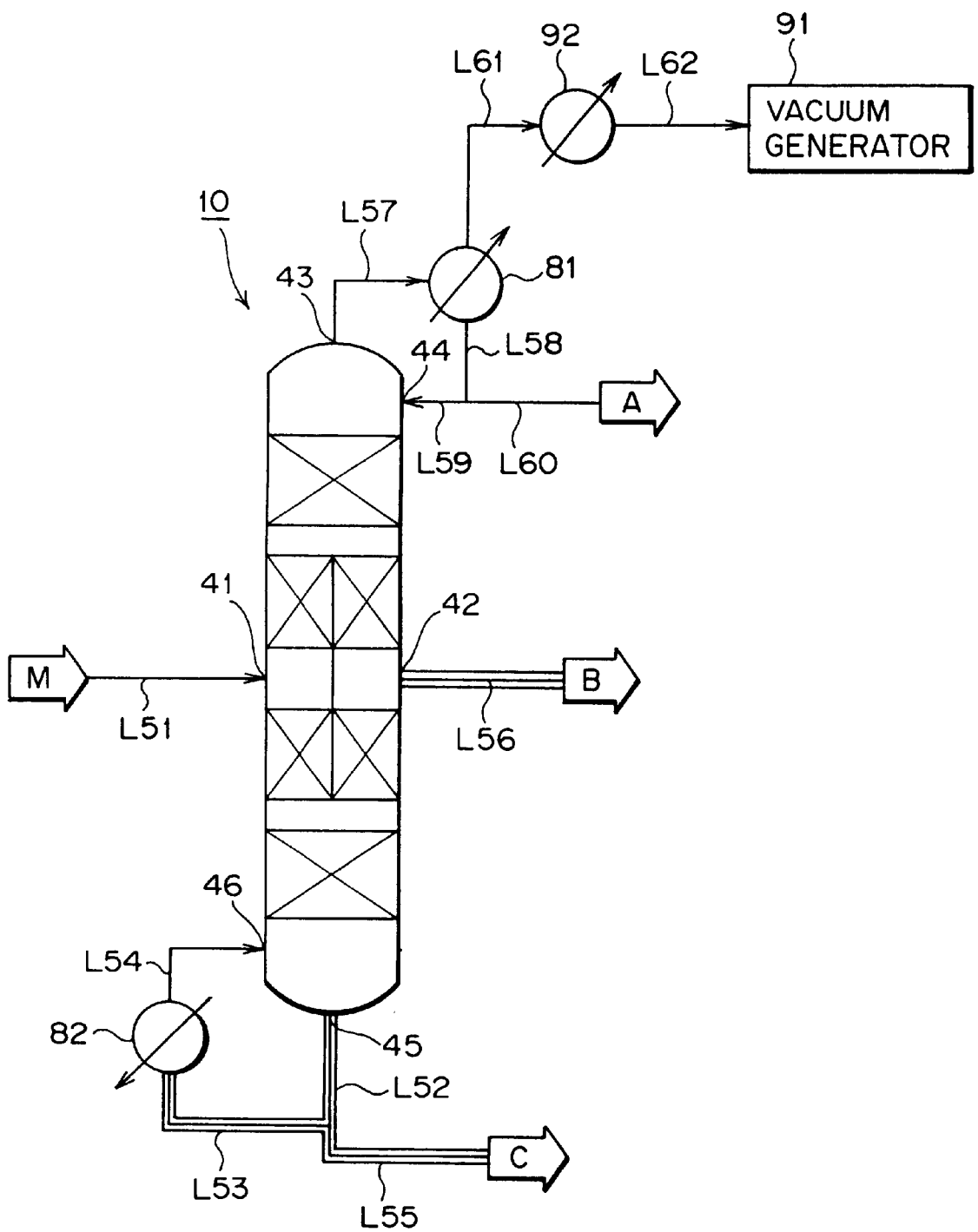
FIG. 11 is a conceptual view of a distillation apparatus according to a first embodiment of the present invention.
Figure 12:
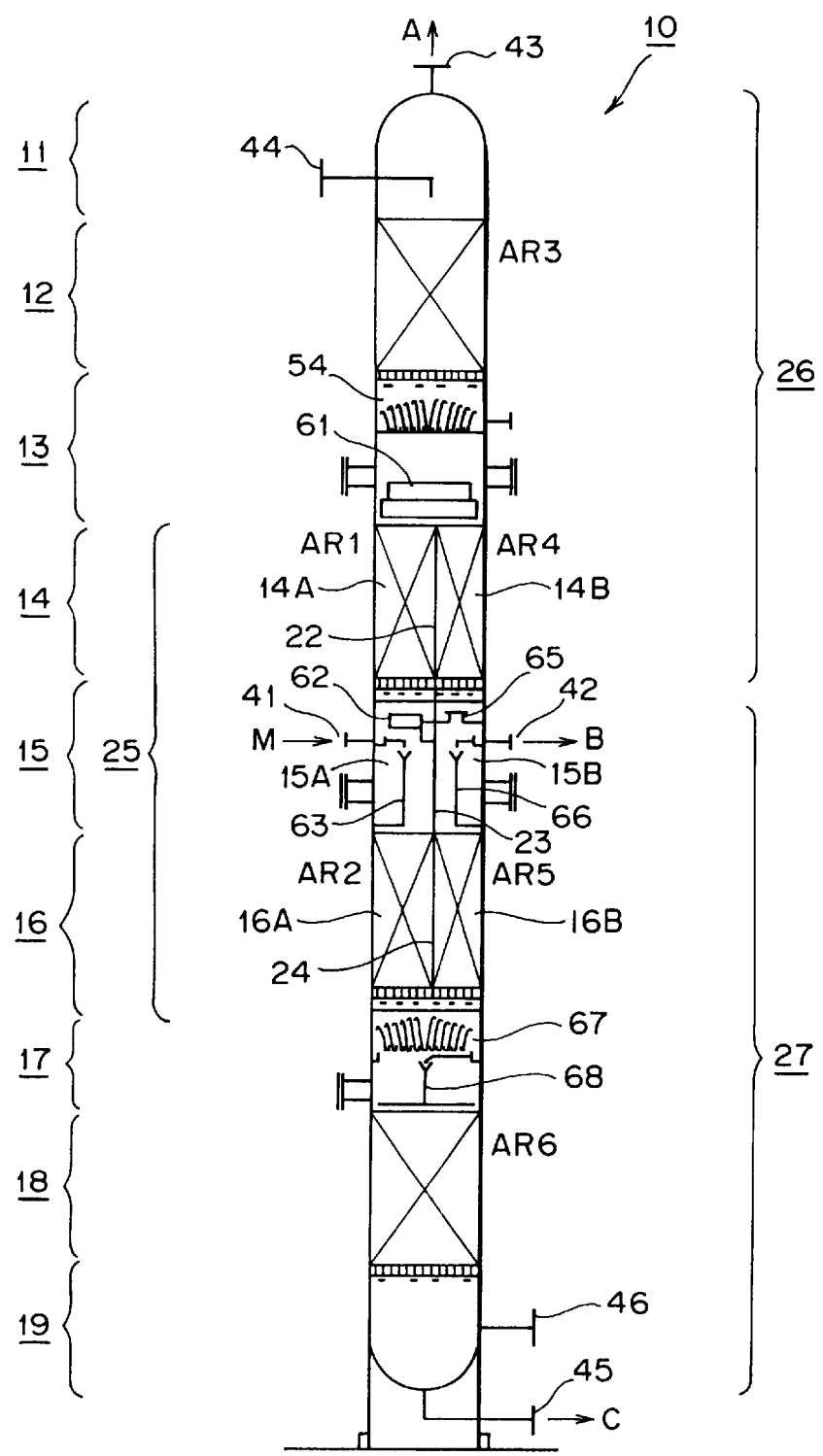
FIG. 12 is a conceptual view of a coupling-type distillation column used in the distillation apparatus of the first embodiment.

FIG. 11 conceptually shows a distillation apparatus according to a first embodiment of the present invention. FIG. 12 conceptually shows a coupling-type distillation column used in the distillation apparatus of the first embodiment.

In the drawings, reference numeral 10 denotes a coupling-type distillation column. The coupling-type distillation column 10 includes a first section 11, a second section 12, a third section 13, a fourth section 14, a fifth section 15, a sixth section 16, a seventh section 17, an eighth section 18, and a ninth section 19.

In a column body of the coupling-type distillation column 10, a partition 22 divides the fourth section 14 into a first chamber 14A and a second chamber 14B; a partition 23 divides the fifth section 15 into a first chamber 15A and a second chamber 15B; and a partition 24 divides the sixth section 16 into a first chamber 16A and a second chamber 16B. The first chambers 14A–16A are adjacent to the second chambers 14B–16B, respectively. The first chambers 14A–16A constitute a first distillation section 25; the first section 11, the second section 12, the third section 13, and the second chamber 14B constitute a second distillation section 26; and the second chambers 15B and 16B, the seventh section 17, the eighth section 18, and the ninth section 19 constitute a third distillation section 27.

Notably, the partitions 22–24 can be made heat insulating through employment of a design such that the partitions 22–24 are formed of an insulating material or a design such that the interiors of the partitions 22–24 are made vacuum. In this case, since there can be reduced heat transmission between the first chamber 14A and the second chamber 14B, between the first chamber 15A and the second chamber 15B, and between the first chamber 16A and the second chamber 16B, the efficiency of distillation can be enhanced.

The fifth section 15 is disposed substantially at the vertical center of the coupling-type distillation column 10. A feed nozzle 41 is formed on the side of the coupling-type distillation column 10 at a position corresponding to the first chamber 15A. Similarly, a side cut nozzle 42 is formed on the side of the coupling-type distillation column 10 at a position corresponding to the second chamber 15B. The first section 11 is disposed at the top of the coupling-type distillation column 10. A vapor outlet 43 and a reflux liquid inlet 44, which are connected to a condenser 81, are formed at the first section 11. The ninth section 19 is disposed at the bottom of the coupling-type distillation column 10. A column-bottom liquid outlet 45 and a vapor inlet 46, which are connected to an evaporator 82, are formed at the ninth section 19.

In the thus-configured coupling-type distillation column 10, a material liquid M containing three components A, B, and C is fed to the feed nozzle 41 through a line L51. Component A is lower in boiling point than component B, which in turn is lower in boiling point than component C. Component A serves as a low-boiling-point component; component B serves as a medium-boiling-point component; and component C serves as a high-boiling-point component. Components B and C are formed from respective high-melting-point materials.

In the first distillation section 25, the first chamber 14A disposed above the feed nozzle 41 forms an enriching section AR1, and the first chamber 16A disposed below the feed nozzle 41 forms an exhaust section AR2. In the second distillation section 26, the second section 12 connected to and disposed above the upper end of the first distillation section 25 forms an enriching section AR3, and the second chamber 14B disposed below the upper end of the first distillation section 25 while being adjacent to the enriching section AR1 forms an exhaust section AR4. In the third distillation section 27, the second chamber 16B connected to and disposed above the lower end of the first distillation section 25 while being adjacent to the exhaust section AR2 forms an enriching section AR5, and the eighth section 18 disposed below the lower end of the first distillation section 25 forms an exhaust section AR6.

As described above, the upper end of the first distillation section 25 is connected to the substantial vertical center of the second distillation section 26, and the lower end of the first distillation section 25 is connected to the substantial vertical center of the third distillation section 27.

In the exhaust section AR2, the material liquid M fed through the feed nozzle 41 undergoes vapor-liquid separation such that vapor rich in components A and B is generated at an upper portion thereof, while fluid composed of vapor and liquid rich in components B and C is increasingly generated along the descending direction. The fluid is fed to the third distillation section 27 from the lower end of the first distillation section 25.

The fluid is heated in the third distillation section 27 to thereby become vapor rich in components B and C. During ascending in the exhaust section AR2, the vapor rich in components B and C contacts the material liquid M. As a result, component A contained in the material liquid M is prevented from descending and is thus collected. Thus is prevented entry of component A into the third distillation section 27.

The vapor rich in components A and B ascends in the enriching section AR1 and is then fed to the second distillation section 26 from the upper end of the first distillation section 25. The vapor rich in components A and B is cooled in the second distillation section 26 to thereby be condensed into liquid rich in components A and B.

A portion of the liquid rich in components A and B is refluxed to the enriching section AR1 and brought into contact with the vapor rich in components A and B which is ascending in the enriching section AR1.

In this manner, the vapor rich in components A and B can be fed to the second distillation section 26 from the upper end of the first distillation section 25.

In the exhaust section AR6, liquid rich in components B and C descends, during which vapor rich in component B is generated at an upper portion thereof, and liquid rich in component C is increasingly generated along the descending direction. The liquid rich in component C is discharged as a column-bottom liquid to a line L52 from the column-bottom liquid outlet 45.

A portion of the column-bottom liquid is sent to the evaporator 82 through a line L53. In the evaporator 82, the liquid is evaporated through application of heat to become vapor rich in component C. The vapor rich in component C is fed to the vapor inlet 46 through a line L54 to thereby be fed to the ninth section 19. During ascending in the ninth section 19 and the exhaust section AR6, the vapor rich in component C contacts liquid rich in components B and C; as a result, vapor rich in component B is generated from the liquid rich in components B and C. The remaining column-bottom liquid is fed to an unillustrated column-bottom liquid accommodation section through the line L55.

Then) a portion of the vapor rich in component B ascends in the enriching section AR5, during which the portion of the vapor rich in component B contacts the liquid rich in component B from the second distillation section 26 at the upper end of the third distillation section 27 to thereby become liquid rich in component B. The liquid rich in component B obtained at the upper end of the third distillation section 27 is discharged as a side cut liquid from the side cut nozzle 42 to a line L56. The discharged side cut liquid is fed to an unillustrated side cut liquid accommodation section. The line L56 serves as the first discharge system.

In the exhaust section AR4 of the second distillation section 26, liquid rich in components A and B descends, during which vapor rich in component A is generated at an upper portion thereof, and liquid rich in component B is increasingly generated along the descending direction. The liquid rich in component B obtained at the lower end of the second distillation section 26 is discharged as the side cut liquid from the side cut nozzle 42 to the line L56.

The vapor rich in component A ascends in the enriching section AR3 and is then discharged from the vapor outlet 43 to a line L57. The discharged vapor rich in component A is sent to the condenser 81, where the vapor is condensed into liquid rich in component A, which is discharged as distillate to a line L58. In order to enhance the efficiency of distillation for component A, a portion of the distillate is sent to the reflux liquid inlet 44 through a line L59 and refluxed into the first section 11 through the reflux liquid inlet 114. The refluxed distillate is brought into contact with vapor rich in components A and B ascending in the enriching section AR3. The remaining distillate is fed to an unillustrated distillate accommodation section through a line L60.

As described above, vapor rich in components A and B is separated into vapor rich in component A and liquid rich in component B by means of the second distillation section 26. The vapor rich in component A is discharged from the top of the column body and condensed into liquid rich in component A by means of the condenser 81. The liquid rich in component B is discharged as a side cut liquid from the side cut nozzle 42. Liquid rich in components B and C is separated into liquid rich in component B and liquid rich in component C by means of the third distillation section 27. The liquid rich in component B is discharged as a side cut liquid from the side cut nozzle 42. The liquid rich in component C is discharged as a column-bottom liquid from the bottom of the column body.

Since the melting points of components B and C are higher than ambient temperature, the lines L52, L53, L55 and L56 assume a double-pipe structure in order to prevent solidification of the side cut liquid within the line L56 and solidification of the column-bottom liquid within the lines L52, L53, and L55. The lines L52, L53, and L55 constitute the second discharge system. The double-pipe structure that the line L56 assumes serves as the first solidification prevention means, and the double-pipe structure that the lines L52, L53, and L55 assume serves as the second solidification prevention means. The double-pipe structure is composed of an inner pipe and an outer pipe disposed concentrically. Steam serving as a heating medium is caused to flow through the space between the inner and outer pipes to thereby prevent solidification of the column-bottom liquid on the side cut liquid flowing through the inner pipe. The present embodiment employs the double-pipe structure as the first and second solidification prevention means. However, steam tracing may be employed in place of the double-pipe structure. Steam tracing is composed of a primary pipe and a secondary pipe disposed in parallel. Steam serving as a heating medium is caused to flow through the secondary pipe to thereby prevent solidification of the column-bottom liquid or the side cut liquid flowing through the primary pipe.

Each of the enriching sections AR1, AR3, and AR5 and the exhaust sections AR2, AR4, and AR6 is formed of a packing including a single node. However, depending on relative volatility among components to be obtained through distillation, each of the enriching sections AR1, AR3, and AR5 and the exhaust sections AR2, AR4, and AR6 may be formed of a packing including a plurality of nodes corresponding to characteristics of a packing to be used, in order to attain the number of theoretical stages required for distillation. Also, a distributor may be disposed between the nodes. Furthermore, the feed nozzle 41 and the side cut nozzle 42 are not necessarily disposed at the same level.

As described above, through use of the coupling-type distillation column 10, the material liquid M can be separated into components A–C without use of a plurality of distillation columns.

Since there is no need to repeat heating and cooling in a plurality of distillation columns, the number of instruments, such as condensers, evaporators, and pumps, can be reduced. Accordingly, an area to be occupied by the distillation apparatus can be reduced, and the amount of consumption of utilities and consumed energy can be reduced as well, thereby reducing the cost of the distillation apparatus.

Preferably, the coupling-type distillation column 10 has a total of about 30–100 theoretical stages, and about 5–30 theoretical stages are allocated to each of the fourth section 14 and the sixth section 16.

Meanwhile, the third section 13 includes a collector 54 and a channel-type distributor 61. Liquid collected by the collector 54 is distributed to the first chamber 14A and the second chamber 14B of the fourth section 14 in predetermined different portions by means of the distributor 61.

The first chamber 15A of the fifth section 15 includes a collector 62 disposed just above the feed nozzle 41 and a tubular distributor 63 disposed just under the feed nozzle 41. Liquid collected by the collector 62, together with the material liquid M fed through the feed nozzle 41, is fed to the first chamber 16A of the sixth section 16 by means of the distributor 63.

Meanwhile, the second chamber 15B of the fifth section 15 includes a chimney-hat-type collector 65 disposed just above the side cut nozzle 42 and a tubular distributor 66 disposed just under the side cut nozzle 42. Liquid collected by the collector 65 is discharged as a side cut liquid from the side cut nozzle 42 and fed to the second chamber 16B of the sixth section 16 by means of the distributor 66.

Furthermore, the seventh section 17 includes a collector 67 and a tubular distributor 68. Liquid descending from the sixth section 16 is collected by the collector 67 and is then fed to the eighth section 18 by means of the distributor 68.

In the present embodiment, when vapor rich in component A discharged from the top of the column body is condensed by means of the condenser) 81, ordinary cooling water is used as a cooling medium for cooling the vapor. Since the melting point of component A is lower than the temperature of cooling water (for example, the melting point of component A is lower than a cooling water temperature of 30° C. to 35° C.), the vapor rich in component A can be sufficiently condensed without involvement of solidification of the vapor within the condenser 81.

Accordingly, there is no need to use hot water, cooling oil, or steam as the cooling medium. As a result, there is no need to connect a cooling system to the condenser, 81.

In order to reduce energy consumed for heating a column-bottom liquid in the evaporator 82, preferably the evaporator 82 is lowered in temperature. However, when the evaporator 82 is lowered in temperature, evaporation of the column-bottom liquid becomes difficult accordingly. In order to cope with this problem, a vacuum generator 91 serving as the negative-pressure generation means is connected to the condenser 81, so as to establish a negative pressure within the coupling-type distillation column 10. As a result, the column-bottom liquid can be readily evaporated. Also, vent gas generated within the coupling-type distillation column 10 can be drawn out and released into the atmosphere.

In this case, a gas cooler 92 is disposed between the condenser 81 and the vacuum generator 91 in order to cool vent gas withdrawn by means of the vacuum generator 91. A line L61 connects the condenser 81 and the gas cooler 92, and a line L62 connects the gas cooler 92 and the vacuum generator 91. When vent gas mixed with vapor rich in component A is sent from the condenser 81 to the gas cooler 92 and cooled in the gas cooler 92, the vapor becomes liquid rich in component A to thereby be separated from the vent gas. Thus, there is no need to dispose a vent gas treatment apparatus between the condenser 81 and the vacuum generator 91. Notably, the gas cooler 92 can use ordinary cooling water as a cooling medium. The distillation apparatus of the present embodiment includes the column body, the partitions 22–24, the first to third distillation sections 25–27, the condenser 81, the evaporator 82, the vacuum generator 91, the gas cooler 92, and the lines L52, L53, L55, and L56.

As mentioned above, vapor rich in component A is discharged from the top of the column body, and component A is formed from a low-melting-point material. Thus, there is no need to employ various auxiliary apparatus such as a hot water tank, a cooler, an oil tank, a condenser, and a vent scrubber. Therefore, the distillation apparatus allows a reduction in area occupied thereby and can be manufactured and operated at low cost.

According to the present embodiment, the gas cooler 92 is disposed between the condenser 81 and the vacuum generator 91. However, a vent-scrubber-type vent gas treatment apparatus may be disposed in place of the gas cooler 92. In this case, since solution to be used is not required to have the capability of sufficiently adsorbing vapor rich in component A, the cost of operation of the distillation apparatus can be reduced.

According to the present embodiment, vapor rich in component A is discharged from the vapor outlet 43 to the line L57 so as to be sent to the condenser 31. However, a condenser may be disposed in the first section of the column body to thereby connect the top of the column body and the condenser.

Meanwhile, when component B collected as a product contains component C and modified components B' and C', which are impurities, the hue and odor of the product are affected, since component C and modified components B' and C' each have a large molecular mass of carbon. A second embodiment of the present invention, which will be described below, is adapted to prevent entry of impurities into a product. Structural features similar to those of the first embodiment are denoted by common reference numerals, and repeated description thereof is omitted.

Figure 13:
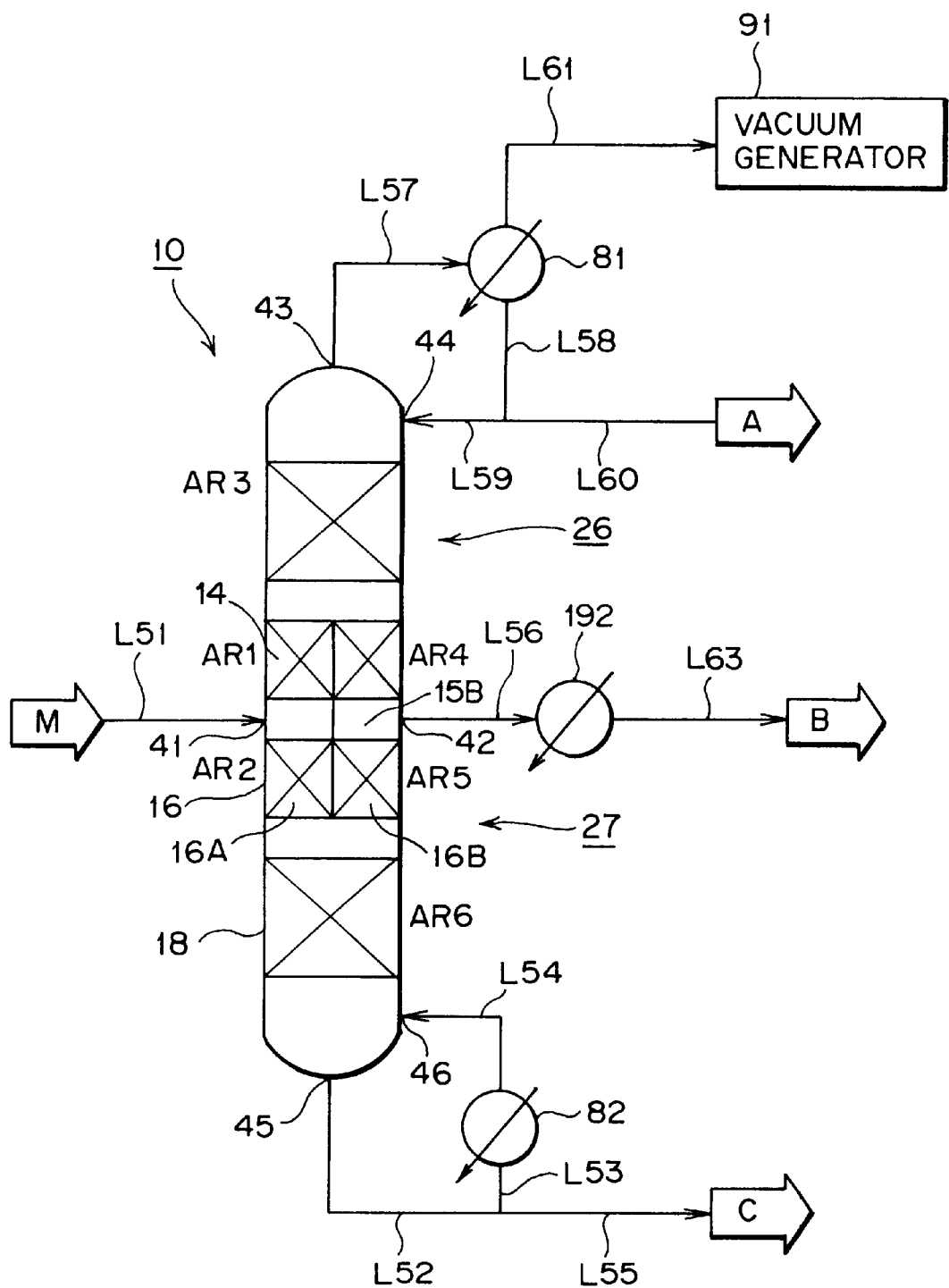
FIG. 13 is a conceptual view of a distillation apparatus according to a second embodiment of the present invention.

FIG. 13 conceptually shows a distillation apparatus according to the second embodiment.

In this case, a portion of vapor rich in component B ascends in the enriching section AR5 and contacts liquid rich in component B descending from the second distillation section 26 at the upper end of the third distillation section 27 to thereby become liquid rich in component B. In the exhaust section AR4 of the second distillation section 26, liquid rich in components A and B descends, during which vapor rich in component A is generated at an upper portion thereof, and liquid rich in component B is increasingly generated along the descending direction. The liquid rich in component B is enriched in the second chamber 15B. The enriched liquid is discharged as a side cut liquid or a product from the side of the column body to the line L56 through the side cut nozzle 42. The discharged side cut liquid is fed to a cooler 192, where the liquid is cooled. The cooled side cut liquid is discharged to a line L63 and fed through the line L63 to an unillustrated side cut liquid accommodation section.

In this case, the liquid rich in component B is enriched in the second chamber 15B, and the enriched liquid is discharged as a product from the side of the column body through the side cut nozzle 42. Meanwhile, liquid rich in component C is enriched in the first chamber 16A and the second chamber 16B and is further enriched in the eighth section 18. Subsequently, the enriched liquid is discharged from the bottom of the column body through the column-bottom liquid outlet 45. Modified components B' and C' formed through decomposition of components B and C are collected in the vicinity of the bottom of the column body and discharged from the column bottom through 'the column-bottom liquid outlet 45.

Thus, component B does not contact component C and modified components B' and C' while these components are in the form of liquid. Therefore, the product to be collected does not contain component C and modified components B' and C'. Which are impurities. As a result, the hue and odor of the product are not affected.

Also, entry of impurities into the product can be prevented without use of auxiliary apparatus such as a valve, a product condenser, a receiver, and a heater, thereby reducing the size of the distillation apparatus and the cost of manufacture and operation of the distillation apparatus. Furthermore, there can be simplified equipment for controlling the operation of the distillation apparatus and maintaining the distillation apparatus. Since the product can be collected in the form of liquid, flow rate control of the product can be significantly simplified, thereby reducing the cost of manufacture and operation of the distillation apparatus.

Since the product is collected at the side of the column body, the product is not exposed to high temperature induced by the evaporator 82 disposed at the bottom of the column body. Also, the product does not require additional heating by a heater. Thus, formation of modified component B' within the product can be prevented, thereby enhancing product quality.

The product collected at the side of the column body is immediately cooled by means of the cooler 192, thereby preventing decomposition of component B which would otherwise result from heat held by the product itself. Thus, formation of modified component B' within the product can be more reliably prevented.

Preferably, the coupling-type distillation column 10 has a total of about 30–100 theoretical stages, and about 5–30 theoretical stages are allocated to each of the fourth section 14 and the sixth section 16.

In the present embodiment, each of the enriching sections AR1, AR3, and AR5 and the exhaust sections AR2, AR4, and AR6 is formed of a packing including a single node. However, depending on relative volatility among components to be obtained through distillation, each of the enriching sections AR1, AR3, and AR5 and the exhaust sections AR2, AR4, and AR6 may be formed of a packing including a plurality of nodes corresponding to characteristics of a packing to be used, in order to attain the number of theoretical stages required for distillation. Also, a distributor may be disposed between the nodes. Furthermore, the feed nozzle 41 and the side cut nozzle 42 are not necessarily disposed at the same level.

Next will be described a third embodiment of the present invention adapted to separate, through distillation, components A and B from a material liquid M containing two components A and B. Structural features similar to those of the first embodiment are denoted by common reference numerals, and repeated description thereof is omitted.

Figure 14:
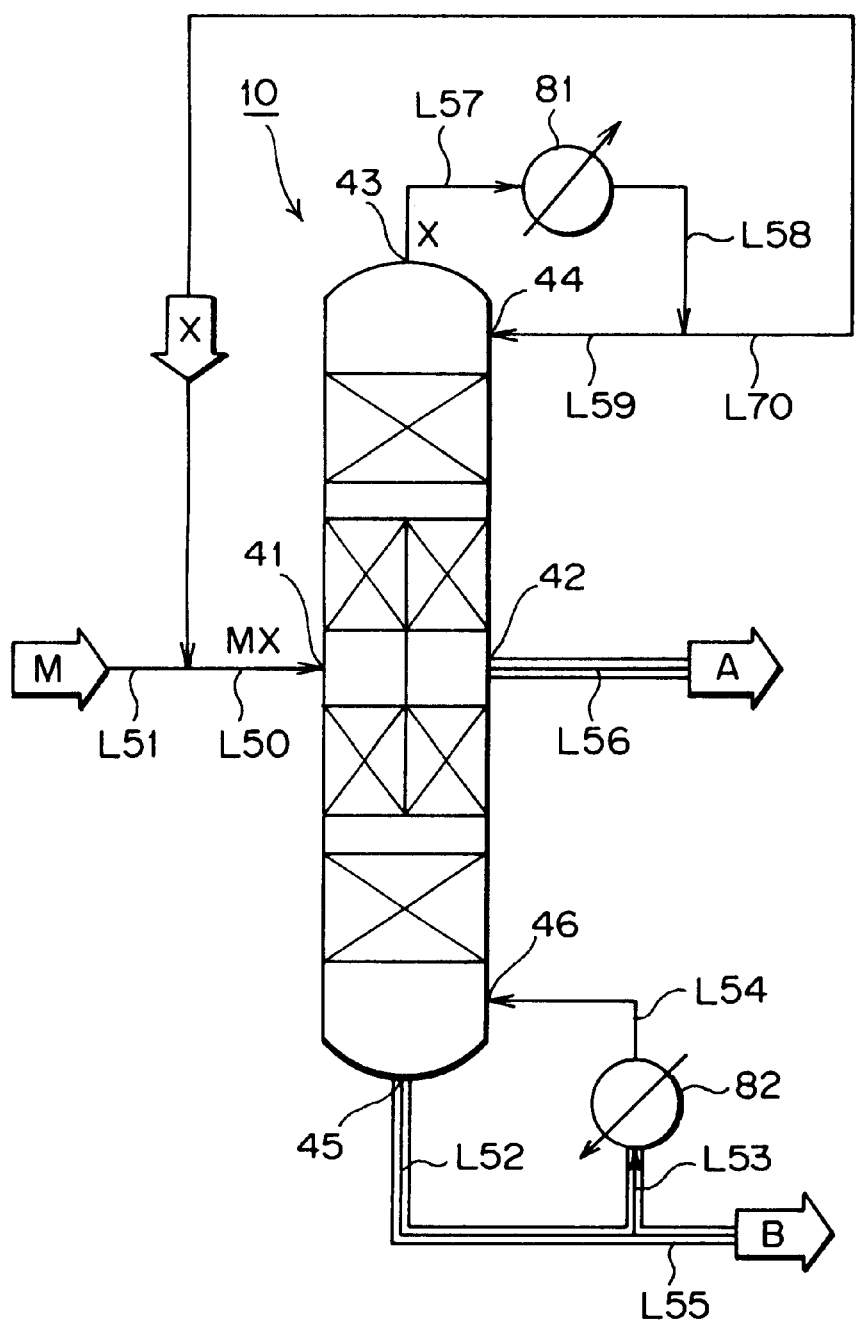
FIG. 14 is a conceptual view of a distillation apparatus according to a third embodiment of the present invention.
Figure 15:
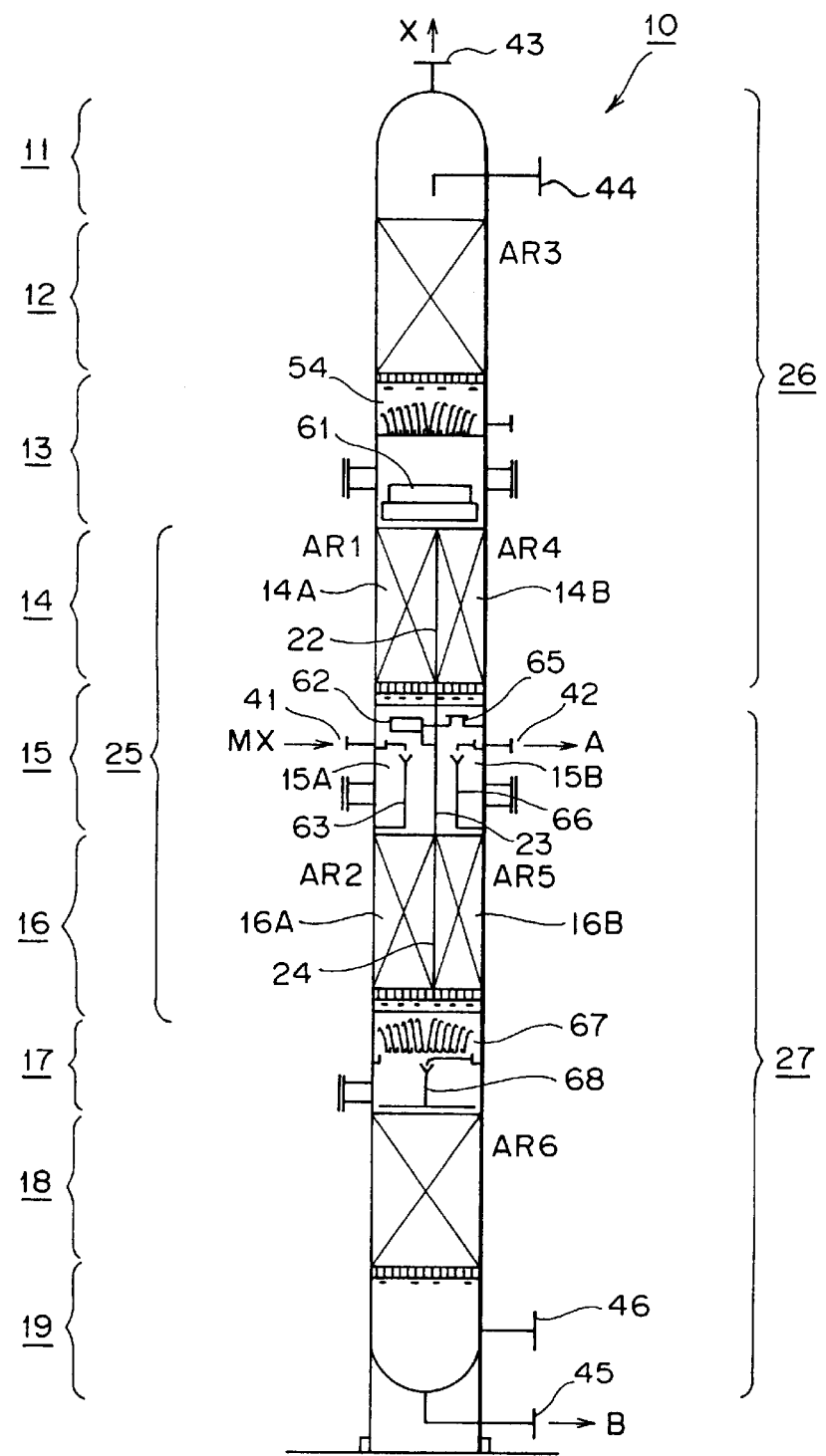
FIG. 15 is a conceptual view of a coupling-type distillation column used in the distillation apparatus of the third embodiment.

FIG. 14 conceptually shows a distillation apparatus according to a third embodiment of the present invention. FIG. 15 conceptually shows a coupling-type distillation column used in the distillation apparatus of the third embodiment.

In this case, components A and B are separated, through distillation, from the material liquid M containing two components A and B. Component X serving as an additive component and fed through a line L70 is added to the material liquid M fed through the line L51 to thereby form an adjusted material liquid MX containing components A, B, and X. The adjusted material liquid MX is fed to the feed nozzle 41 through the line L50. Component X is lower in boiling point than component A, which in turn is lower in boiling point than component B. Component X serves as an additive component; component A serves as a low-boiling-point component; and component B serves as a high-boiling-point component. Components A and B are formed from respective high-melting-point materials. Component A is formed from such a material that can be readily separated from component A and is unlikely to be modified during distillation.

The operation of the distillation apparatus will next be described.

In the exhaust section AR2, the adjusted material liquid MX fed through the feed nozzle 41 undergoes vapor-liquid separation such that vapor rich in components X and A is generated at an upper portion thereof, while fluid composed of vapor and liquid rich in components A and B is increasingly generated along the descending direction. The fluid is fed to the third distillation section 27 from the lower end of the first distillation section 25.

The fluid is heated in the third distillation section 27 to thereby become vapor rich in components A and B. During ascending in the exhaust section AR2, the vapor rich in components A and B contacts the adjusted material liquid MX. As a result, component X contained in the adjusted material liquid MX is prevented from descending and is thus collected. Thus is prevented mixing of component X into the fluid fed to the third distillation section 27.

The vapor rich in components X and A ascends in the enriching section AR and is then fed to the second distillation section 26 from the upper end of the first distillation section 25. The vapor rich in components X and A is cooled in the second distillation section 26 to thereby be condensed into liquid rich in components X and A. A portion of the liquid rich in components A and A is refluxed to the enriching section AR1 and brought into contact with the vapor rich in components X and A which is ascending in the enriching section AR1.

In this manner, the vapor rich in components X and A can be fed to the second distillation section 26 from the upper end of the first distillation section 25.

In the exhaust section AR6, liquid rich in components A and B descends, during which vapor rich in component A is generated at an upper portion thereof, and liquid rich in component B is increasingly generated along the descending direction. The liquid rich in component B is discharged as a column-bottom liquid to the line L52 from the column-bottom liquid outlet 45.

A portion of the column-bottom liquid is sent to the evaporator 82 through the line L53. In the evaporator 82, the liquid is evaporated through application of heat to thereby become vapor rich in component B. The vapor rich in component B is fed to the vapor inlet 46 through the line L54 to thereby be fed to the ninth section 19. During ascending in the ninth section 19 and the exhaust section AR6, the vapor rich in component B contacts liquid rich in components A and B; as a result, vapor rich in component A is generated from the liquid rich in components A and B. The remaining column-bottom liquid is fed to an unillustrated column-bottom liquid accommodation section through the line L55.

Then, a portion of the vapor rich in component A ascends in the enriching section ARC, during which the portion of the vapor rich in component A contacts the liquid rich in component A from the second distillation section 26 at the upper end of the third distillation section 27 to thereby become liquid rich in component A. The liquid rich in component A obtained at the upper end of the third distillation section 27 is discharged as a side cut liquid from the side cut nozzle 42 to the line L56. The discharged side cut liquid is fed to an unillustrated side cut liquid accommodation section. As a result, component A can be collected as a product from the side of the coupling-type distillation column 10. The line L56 serves as the first discharge system.

In the exhaust section AR4 of the second distillation section 26, liquid rich in components X and A descends, during which vapor rich in component X is generated at an upper portion thereof, and liquid rich in component A is increasingly generated along the descending direction.

The vapor rich in component X ascends in the enriching section AR3 and is then discharged from the vapor outlet 43 to the line L57. The discharged vapor rich in component X is sent to the condenser 81, where the vapor is condensed into liquid rich in component X, which is discharged as distillate to the line L58. In order to enhance the efficiency of distillation for component X, a portion of the distillate is sent to the reflux liquid inlet 44 through the line L59 and refluxed into the first section 11 through the reflux liquid inlet 44. The refluxed distillate is brought into contact with vapor rich in components X and A ascending in the enriching section AR3. The remaining distillate is added to the material liquid M through the line L70.

As described above, vapor rich in components X and A is separated into vapor rich in component X and liquid rich in component A by means of the second distillation section 26. At the top of the column body the vapor rich in component X is discharged through the vapor outlet 43 and condensed into liquid rich in component X by means of the condenser 81. The liquid rich in component X is discharged as distillate from the condenser 81. At the side of the column body the liquid rich in component A is discharged as a side cut liquid through the side cut nozzle 42. Liquid rich in components A and B is separated into liquid rich in component A and liquid rich in component B by means of the third distillation section 27. The liquid rich in component A is discharged as a side cut liquid through the side cut nozzle 42. At the bottom of the column body the liquid rich in component B is discharged as a column-bottom liquid through the column-bottom liquid outlet 45.

As described above, the adjusted material liquid MX can be separated into components X, A, and B without use of a plurality of distillation columns. Since there is no need to repeat heating and cooling in a plurality of distillation columns, the number of instruments, such as condensers, evaporators, and pumps, can be reduced. Accordingly, an area to be occupied by the distillation apparatus can be reduced, and the amount of consumption of utilities and consumed energy can be reduced as well, thereby reducing the cost of the distillation apparatus.

Since the melting points of components A and B are higher than ambient temperature the lines L52, L53, L55, and L56 assume a double-pipe structure in order to prevent solidification of the side cut liquid within the line L56 and solidification of the column-bottom liquid within the lines L52, L53, and L55. The lines L52, L53, and L55 constitute the second discharge system. The double-pipe structure that the line L56 assumes serves as the first solidification prevention means, and the double-pipe structure that the lines L52, L53, and L55 assume serves as the second solidification prevention means. The double-pipe structure is composed of an inner pipe and an outer pipe disposed concentrically. Steam serving as a heating medium is caused to flow through the space between the inner and outer pipes to thereby prevent solidification of the column-bottom liquid on the side cut liquid flowing through the inner pipe. The present embodiment employs the double-pipe structure as the first and second solidification prevention means. However, steam tracing may be employed in place of the double-pipe structure. Steam tracing is composed of a primary pipe and a secondary pipe disposed in parallel. Steam serving as a heating medium is caused to flow through the secondary pipe to thereby prevent solidification of the column-bottom liquid or the side cut liquid flowing through the primary pipe.

Through addition of component X to the material liquid M, vapor rich in component X is discharged from the top of the column body. Thus, there is no need to collect component A as a product at the top of the column body. Since the vapor rich in component X is condensed by means of the condenser 81, there is no need to condense vapor rich in component A by means of a condenser.

When the vapor rich in component X discharged from the top of the column body is condensed by means of the condenser 81, ordinary cooling water is used as a cooling medium for cooling the vapor. Since the melting point of component X is lower than the temperature of cooling water (for example, the melting point of component X is lower than a cooling water temperature of 30° C. to 35° C.), the vapor rich in component X can be sufficiently condensed without involvement of solidification of the vapor within the condenser 81.

Accordingly, there is no need to use hot water, cooling oil, or steam as the cooling medium. As a result, there is no need to connect a cooling system to the condenser 81.

In order to reduce energy consumed for heating a column-bottom liquid in the evaporator 82, preferably the evaporator 82 is lowered in temperature. However, when the evaporator 82 is lowered in temperature, evaporation of the column-bottom liquid becomes difficult accordingly. In order to cope with this problem, an unillustrated vacuum generator serving as the negative-pressure generation means is connected to the condenser 81, so as to establish a negative pressure within the coupling-type distillation column 10. As a result, the column-bottom liquid can be readily evaporated. Also, vent gas generated within the coupling-type distillation column 10 can be drawn out and released into the atmosphere.

In this case, an unillustrated gas cooler is disposed between the condenser 81 and the unillustrated vacuum generator in order to cool vent gas withdrawn by means of the vacuum generator. Thus, when vent gas mixed with vapor rich in component X is sent from the condenser 81 to the gas cooler and cooled in the gas cooler, the vapor becomes liquid rich in component X to thereby be separated from the vent gas. Thus, there is no need to dispose a vent gas treatment apparatus between the condenser 81 and the vacuum generator. Notably, the gas cooler can use ordinary cooling water as a cooling medium.

As mentioned above, vapor rich in component X is discharged from the top of the column body, and component X is formed from a low-melting-point material. Thus, there is no need to employ various auxiliary apparatus such as a hot water tank, a cooler, an oil tank, a condenser, a vent scrubber, and a heat exchanger. Therefore, the distillation apparatus allows a reduction in area occupied thereby and can be manufactured and operated at low cost.

Also, a portion of the distillate is refluxed to the first section 11 through the reflux liquid inlet 44, and the remaining distillate is added to the material liquid M through the line L70. Thus, component X can be repeatedly used through addition to the material liquid M, thereby reducing the cost of operation of the distillation apparatus.

Next, a fourth embodiment of the present invention will be described. Structural features similar to those of the third embodiment are denoted by common reference numerals, and repeated description thereof is omitted.

Figure 16:
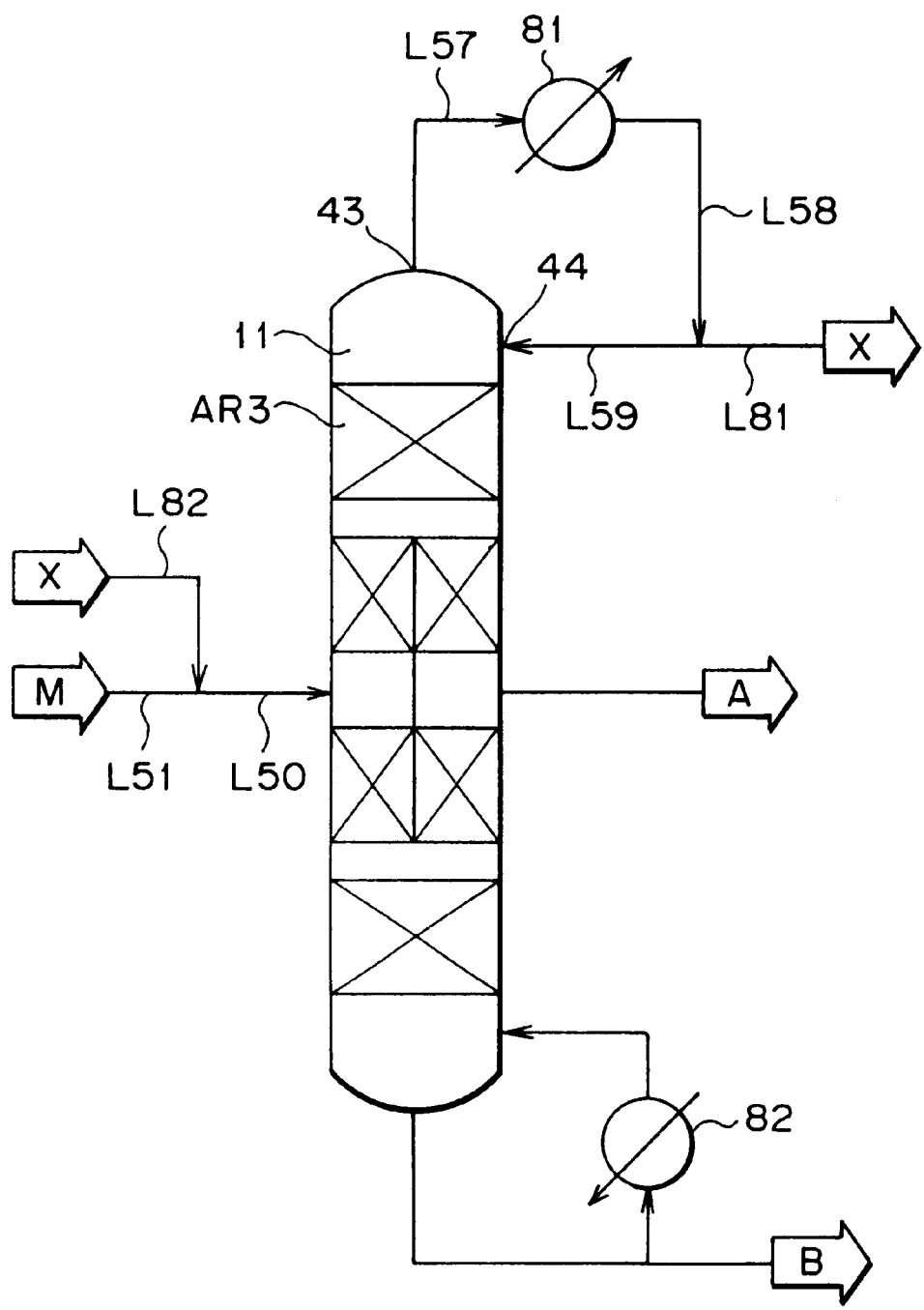
FIG. 16 is a conceptual view of a distillation apparatus according to a fourth embodiment of the present invention.

FIG. 16 conceptually shows a distillation apparatus according to the fourth embodiment of the present invention.

In this case, vapor rich in component X is discharged from the vapor outlet 43 to the line L57. The discharged vapor rich in component X is sent to the condenser 81, where the vapor is condensed into liquid rich in component X, which is discharged as distillate to the line L58. In order to enhance the efficiency of distillation for component X, most of the distillate is sent to the reflux liquid inlet 44 through the line L59 and refluxed into the first section 11 through the reflux liquid inlet 44. The refluxed distillate is brought into contact with vapor rich in components X and A ascending in the enriching section AR3. The remaining distillate is discharged through a line L81 for makeup replacement.

Through a line L82, component X is added to the material liquid M in an amount corresponding to the amount of distillate which has been discharged for makeup replacement.

Next, a fifth embodiment of the present invention will be described. Structural features similar to those of the third embodiment ape denoted by common reference numerals, and repeated description thereof is omitted.

Figure 17:
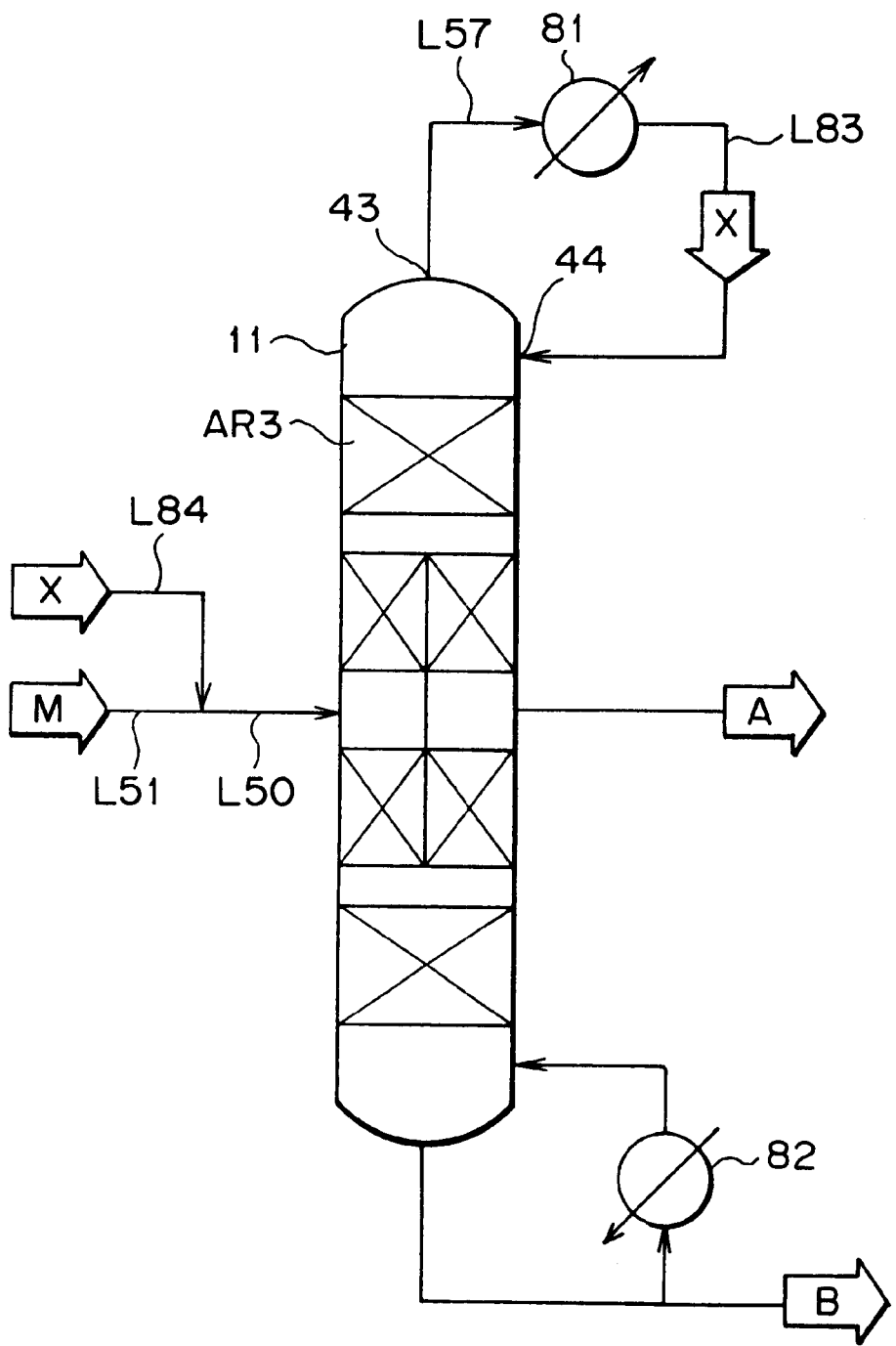
FIG. 17 is a conceptual view of a distillation apparatus according to a fifth embodiment of the present invention.

FIG. 17 conceptually shows a distillation apparatus according to the fifth embodiment of the present invention.

In this case, vapor rich in component Y is discharged from the vapor outlet 43 to the line L57. The discharged vapor rich in component X is sent to the condenser 81, where the vapor is condensed into liquid rich in component X, which is discharged as distillate to a line L83. In order to enhance the efficiency of distillation for component X, all of the distillate is sent to the reflux liquid inlet 44 through the line L83 and refluxed into the first section 11 through the reflux liquid inlet 44. The refluxed distillate is brought into contact with vapor rich in components X and A ascending in the enriching section AR3.

In order to start operation of the distillation apparatus, component X is added in a predetermined amount to the material liquid LI through a line L84.

According to the third through fifth embodiments, an unillustrated gas cooler is disposed between the condenser 81 and the vacuum generator. However, a vent-scrubber-type vent gas treatment apparatus may be disposed in place of the gas cooler. In this case, since solution to be used is not required to have the capability of sufficiently adsorbing vapor rich in component A, which is formed from a high-melting-point material, the cost of operation of the distillation apparatus can be reduced.

According to the third through fifth embodiments, vapor rich in component X is discharged from the vapor outlet 43 to the line L57, and the discharged vapor rich in component X is sent to the condenser 81. However, a condenser may be disposed within the first section of the column body to thereby connect the top of the column body and the condensers Meanwhile, in obtainment of component B as a product from the material liquid M containing components A and B, component B, when heated by means of an evaporator, is decomposed into modified component B', which is higher in boiling point than component B. When component B collected as a product contains modified component B', which is an impurity, the hue and odor of the product are affected, since modified component B' has a large molecular mass of carbon. A sixth embodiment of the present invention, which will be described below, is adapted to prevent entry of impurities into a product. Structural features similar to those of the third embodiment are denoted by common reference numerals, and repeated description thereof is omitted.

Figure 18:
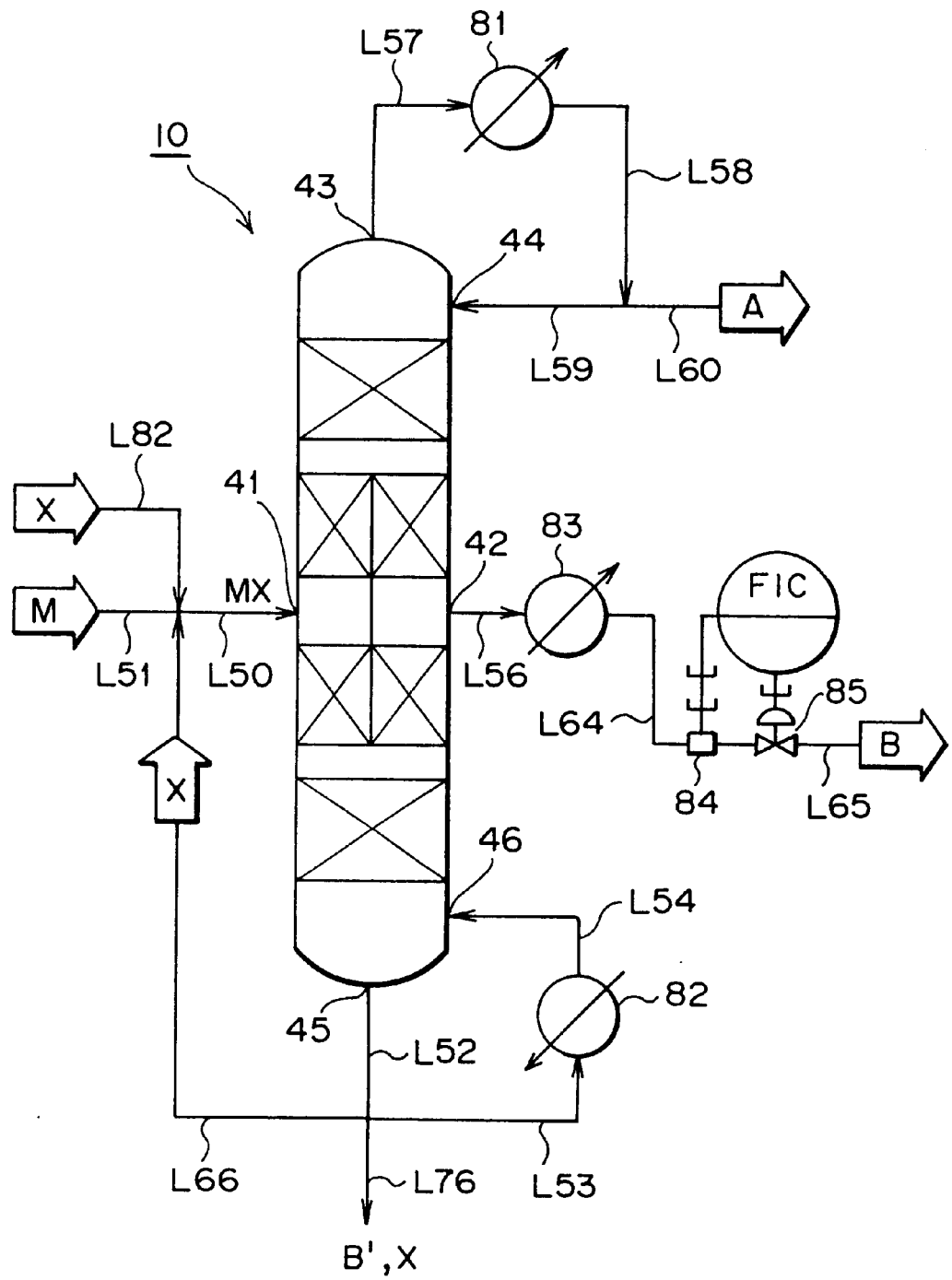
FIG. 18 is a conceptual view of a distillation apparatus according to a sixth embodiment of the present invention.

FIG. 18 conceptually shows a distillation apparatus according to the sixth embodiment of the present invention.

Figure 19:
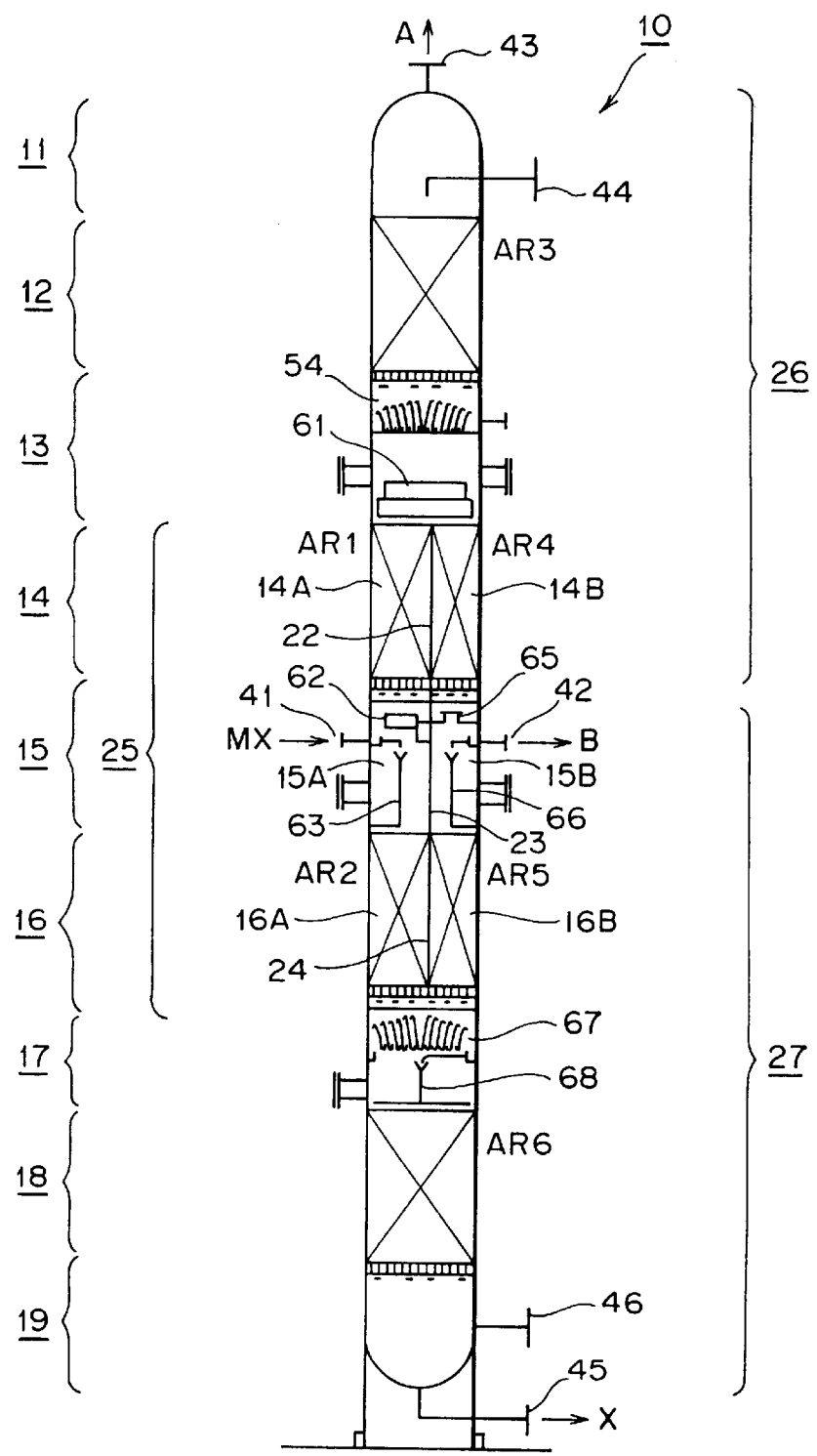
FIG. 19 is a conceptual view of a coupling-type distillation column used in the distillation apparatus of the sixth embodiment.

FIG. 19 conceptually shows a coupling-type distillation column used in the distillation apparatus of the sixth embodiment.

In this case, components A and B are separated, through distillation, from the material liquid M containing two components A and B. Component X serving as an additive component and fed through a line L66 is added to the material liquid M fed through the line L51 to thereby form an adjusted material liquid MX containing components A, B, and X. The adjusted material liquid MX is fed to the feed nozzle 41 through the line L50. Also, component X serving as an initial charge or makeup is added to the material liquid M through the line L82. Component A is lower in boiling point than component B, which in turn is lower in boiling point than component X. Component A serves as a low-boiling-point component; component B serves as a high-boiling-point component; and component X serves as an additive component. Component X is formed from such a material that can be readily separated from component B and is unlikely to be modified during distillation.

The operation of the distillation apparatus will next be described.

In the exhaust section AR2, the adjusted material liquid MX fed through the feed nozzle 41 undergoes vapor-liquid separation such that vapor rich in components A and B is generated at an upper portion thereof, while fluid composed of vapor and liquid rich in components B and X is increasingly generated along the descending direction. The fluid is fed to the third distillation section 27 from the lower end of the first distillation section 25.

The fluid is heated in the third distillation section 27 to thereby become vapor rich in components B and X. During ascending in the exhaust section AR2, the vapor rich in components B and X contacts the adjusted material liquid MX. As a result, component A contained in the adjusted material liquid MX is prevented from descending and is thus collected. Thus is prevented mixing of component A into the fluid fed to the third distillation section 27.

The vapor rich in components A and B ascends in the enriching section AR1 and is then fed to the second distillation section 26 from the upper end of the first distillation section 25. The vapor rich in components A and B is cooled in the second distillation section 206 to thereby be condensed into liquid rich in components A and B. A portion the liquid rich in components A and B is refluxed to the enriching section AR1 and brought into contact with the vapor rich in components A and B which is ascending in the enriching section AR1.

In this manner, the vapor rich in components A and B can be fed to the second distillation section 26 from the upper end of the first distillation section 25.

In the exhaust section AR6, liquid rich in components B and X descends, during which vapor rich in component B is generated at an upper portion thereof, and liquid rich in component X is increasingly generated along the descending direction. The liquid rich in component X is discharged as a column-bottom liquid to the line L52 from the column-bottom liquid outlet 45.

A portion of the column-bottom liquid is sent to the evaporator 82 through the line L53. In the evaporator 82, the liquid is evaporated through application of heat to thereby become vapor rich in component X. The vapor rich in component X is fed to the vapor inlet 46 through the line L54 to thereby be fed to the ninth section 19. During ascending in the ninth section 19 and the exhaust section AR6, the vapor rich in component X contacts liquid rich in components B and X; as a result, vapor rich in component B is generated from the liquid rich in components B and X. The remaining column-bottom liquid is added as an additive component to the material liquid M through the line L66.

Then, a portion of the vapor rich in component B ascends in the enriching section AR5, during which the portion of the vapor rich in component B contacts the liquid rich in component B from the second distillation section 26 at the upper end of the third distillation section 27 to thereby become liquid rich in component B. The liquid rich in component B obtained at the upper end of the third distillation section 27 is discharged as a side cut liquid from the side cut nozzle 42 to the line L56. The discharged side cut liquid is fed to an unillustrated side cut liquid accommodation section via a cooler 83 serving as cooling means, a line L64, a flow regulating valve 85, and a line L65. In this manner, component B can be collected as a product from the side of the coupling-type distillation column 10. A flow sensor 84 is disposed on the line L64. On the basis of a flow rate detected by means of the flow sensor 84, the flow regulating valve 85 is regulated. The lines L56, L64, and L65, the cooler 83, the flow sensor 84, and the flow regulating valve 85 constitute the first discharge system. The lines L52, L53, and L76 constitute the second discharge system.

In the exhaust section AR4 of the second distillation section 26, liquid rich in components A and B descends, during which vapor rich in component A is generated at an upper portion thereof, and liquid rich in component B is increasingly generated along the descending direction.

The vapor rich in component A ascends in the enriching section AR3 and is then discharged from the vapor outlet 43 to the line L57. The discharged vapor rich in component A is sent to the condenser 81, where the vapor is condensed into liquid rich in component A, which is discharged as distillate to the line L58. In order to enhance the efficiency of distillation for component A, a portion of the distillate is sent to the reflux liquid inlet 44 through the line L59 and refluxed into the first section 11 through the reflux liquid inlet 44. The refluxed distillate is brought into contact with vapor rich in components A and B ascending in the enriching section AR3. The remaining distillate is fed to an unillustrated distillate accommodation section through the line L60.

As described above, vapor rich in components A and B is separated into vapor rich in component A and liquid rich in component B by means of the second distillation section 26. The vapor rich in component A is discharged through the vapor outlet 43 and condensed into liquid rich in component A by means of the condenser 81. The liquid rich in component A is discharged as distillate from the condenser 81. The liquid rich in component B is discharged as a side cut liquid through the side cut nozzle 42. Liquid rich in components B and X is separated into liquid rich in component B and liquid rich in component X by means of the third distillation section 27. The liquid rich in component B is discharged as a side cut liquid through the side cut nozzle 42. The liquid rich in component X is discharged as a column-bottom liquid through the column-bottom liquid outlet 45.

As described above, the adjusted material liquid MX can be separated into components A, B, and X without use of a plurality of distillation columns. Since there is no need to repeat heating and cooling in a plurality of distillation columns, the number of instruments, such as condensers, evaporators, and pumps, can be reduced. Accordingly, an area to be occupied by the distillation apparatus can be reduced, and the amount of consumption of utilities and consumed energy can be reduced as well, thereby reducing the cost of the distillation apparatus.

According to the present embodiment, modified component B', which is formed through decomposition of component B and is higher in boiling point than component B, gathers in the vicinity of the bottom of the column body and is then discharged to the line L52 through the column-bottom liquid outlet 45. Subsequently, modified component B', together with a portion of component X, is discharged to an external destination through the line L76. Thus is prevented accumulation of modified component B' at the bottom of the column body.

Thus, modified component B' and component B do not contact each other while these components are in the form of liquid. Therefore, the product to be collected does not contain modified component B', which is an impurity. As a result, the hue and odor of the product are not affected.

Also, impurities can be removed from the product without use of auxiliary apparatus such as a valve, a product condenser, a receiver, and a heater, thereby reducing the size of the distillation apparatus and the cost of manufacture and operation of the distillation apparatus.

Furthermore, there can be simplified equipment for controlling the operation of the distillation apparatus and maintaining the distillation apparatus. Since the product can be collected in the form of liquid, flow rate control of the product can be significantly simplified, thereby reducing the cost of manufacture and operation of the distillation apparatus.

Since the product is collected at the side of the column body, the product is not exposed to high temperature induced by the evaporator 82 disposed at the bottom of the column body. Also, the product does not require additional heating by a heater. Thus, formation of modified component B', which is an impurity, can be prevented, thereby enhancing product quality.

The product collected at the side of the column body is immediately cooled by means of the cooler 83, thereby preventing decomposition of component B which would otherwise result from heat held by the product itself. Thus, formation of modified component BI within the product can be prevented.

Also, a portion of the column-bottom liquid is fed to the ninth section 19, and the remaining column-bottom liquid is added to the material liquid M. Thus, component X can be repeatedly used through addition to the material liquid M, thereby reducing the cost of operation of the distillation apparatus.

In order to carry out distillation in a low-temperature region for prevention of impairment in product quality and to reduce energy consumed for heating a portion of a column-bottom liquid in the evaporator 82, an unillustrated vacuum generator is disposed for use with the condenser 81. The vacuum generator generates a negative pressure within the coupling-type distillation column 10. As a result, the column-bottom liquid can be readily evaporated at low temperature. Also, vent gas generated within the coupling-type distillation column 10 can be drawn out and released into the atmosphere.

Next, a seventh embodiment of the present invention will be described. Structural features similar to those of the sixth embodiment are denoted by common reference numerals, and repeated description thereof is omitted.

Figure 20:
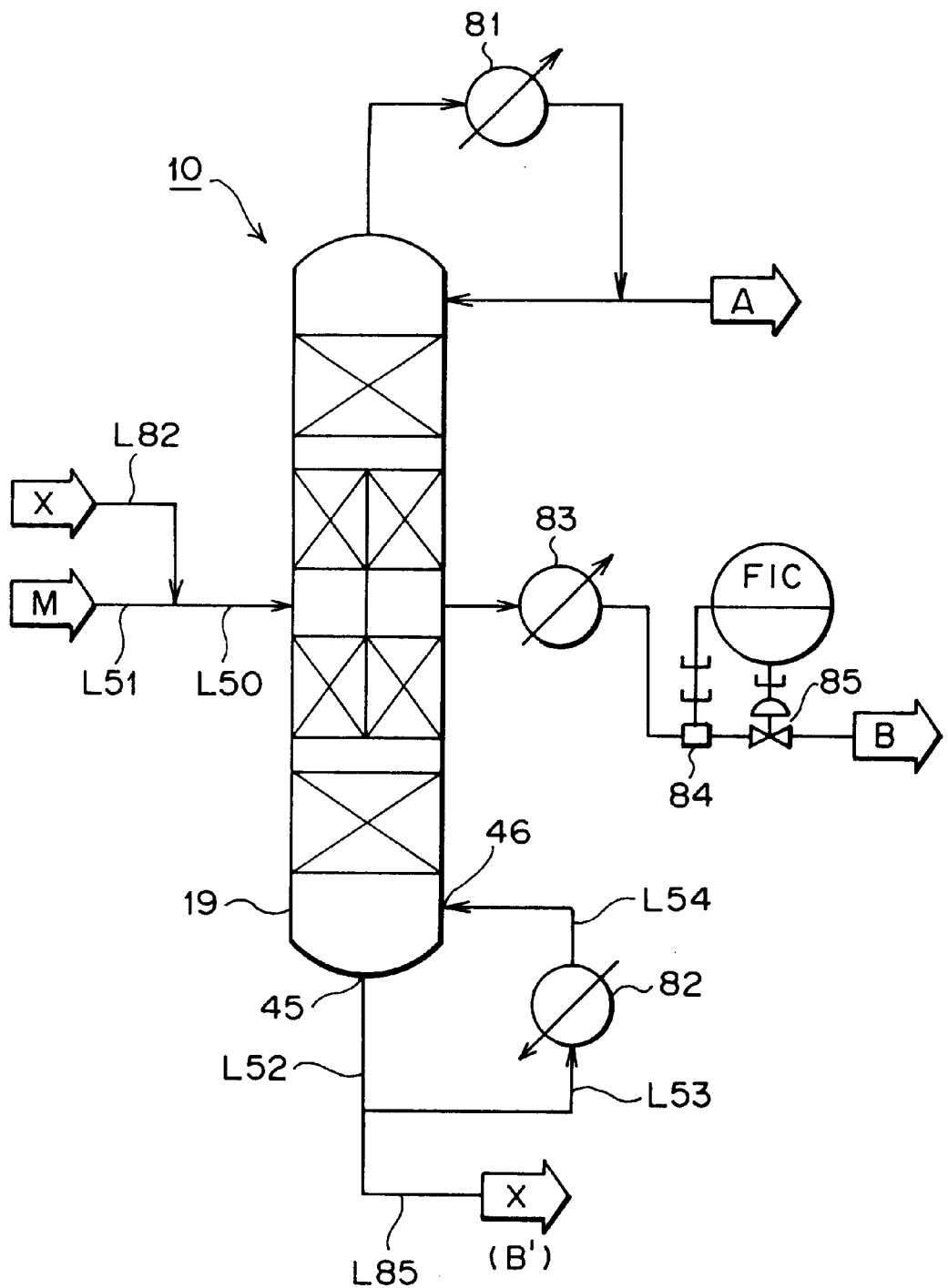
FIG. 20 is a conceptual view of a distillation apparatus according to a seventh embodiment of the present invention.

FIG. 20 conceptually shows a distillation apparatus according to the seventh embodiment of the present invention.

In this case, liquid rich in component X is discharged as a column-bottom liquid from the column-bottom liquid outlet 45 to the line L52. In order to enhance the efficiency of distillation for component X, most of the discharged column-bottom liquid rich in component X is sent to the evaporator 82 through the line L53 and evaporated. The thus-generated vapor is sent to the vapor inlet 46 through the line L54 and fed to the ninth section 19 through the vapor inlet 46. The remaining column-bottom liquid, together with modified component B', is discharged through a line L85 for makeup replacement, Through the line L82, component X is added to the material liquid M in an amount corresponding to the amount of the column-bottom liquid which has been discharged for makeup replacement.

Next, an eighth embodiment of the present invention will be described. Structural features similar to those of the sixth embodiment are denoted by common reference numerals, and repeated description thereof is omitted.

Figure 21:
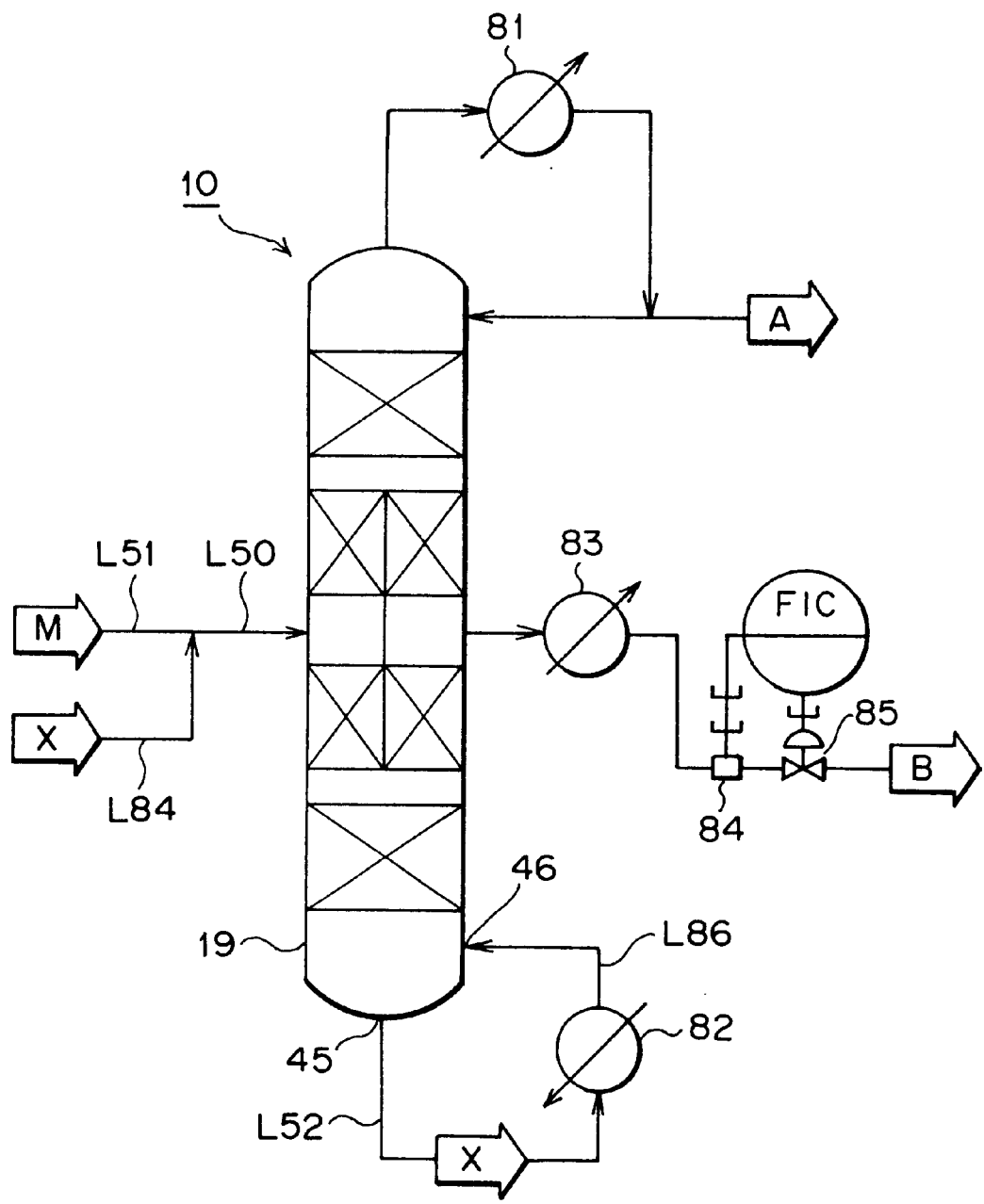
FIG. 21 is a conceptual view of a distillation apparatus according to an eighth embodiment of the present invention.

FIG. 21 conceptually shows a distillation apparatus according to the eighth embodiment of the present invention.

In this case, liquid rich in component X is discharged as a column-bottom liquid to the line L52. In order to enhance the efficiency of distillation for component X, all of the discharged column-bottom liquid is sent to the evaporator 82 through the line L52 and evaporated into vapor rich in component X. The thus-generated vapor rich in component X is sent to the vapor inlet 46 through a line L86 and fed to the ninth section 19 through the vapor inlet 46.

In order to start operation of the distillation apparatus, component X is added in a predetermined amount to the material liquid M through the line L84.

Next, a ninth embodiment of the present invention will be described. Structural features similar to those of the sixth embodiment are denoted by common reference numerals, and repeated description thereof is omitted.

Figure 22:
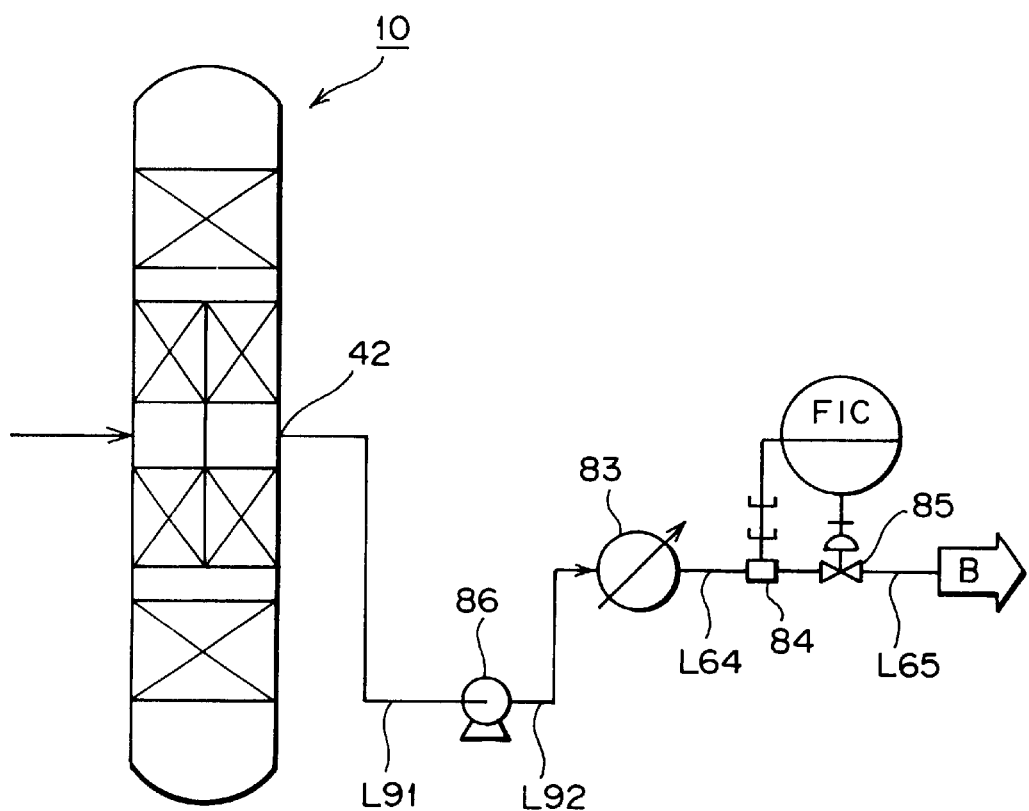
FIG. 22 is a conceptual view of a main portion of a distillation apparatus according to a ninth embodiment of the present invention.

FIG. 22 conceptually shows a main portion of a distillation apparatus according to the ninth embodiment of the present invention.

In this case, liquid rich in component B is discharged as a side cut liquid to a line L91 through the side cut nozzle 42. The side cut liquid is sent under pressure to the cooler 83 serving as cooling means through a line L92 by means of a pump 86.

Next, a tenth embodiment of the present invention will be described. Structural features similar to those of the sixth embodiment are denoted by common reference numerals, and repeated description thereof is omitted.

Figure 23:
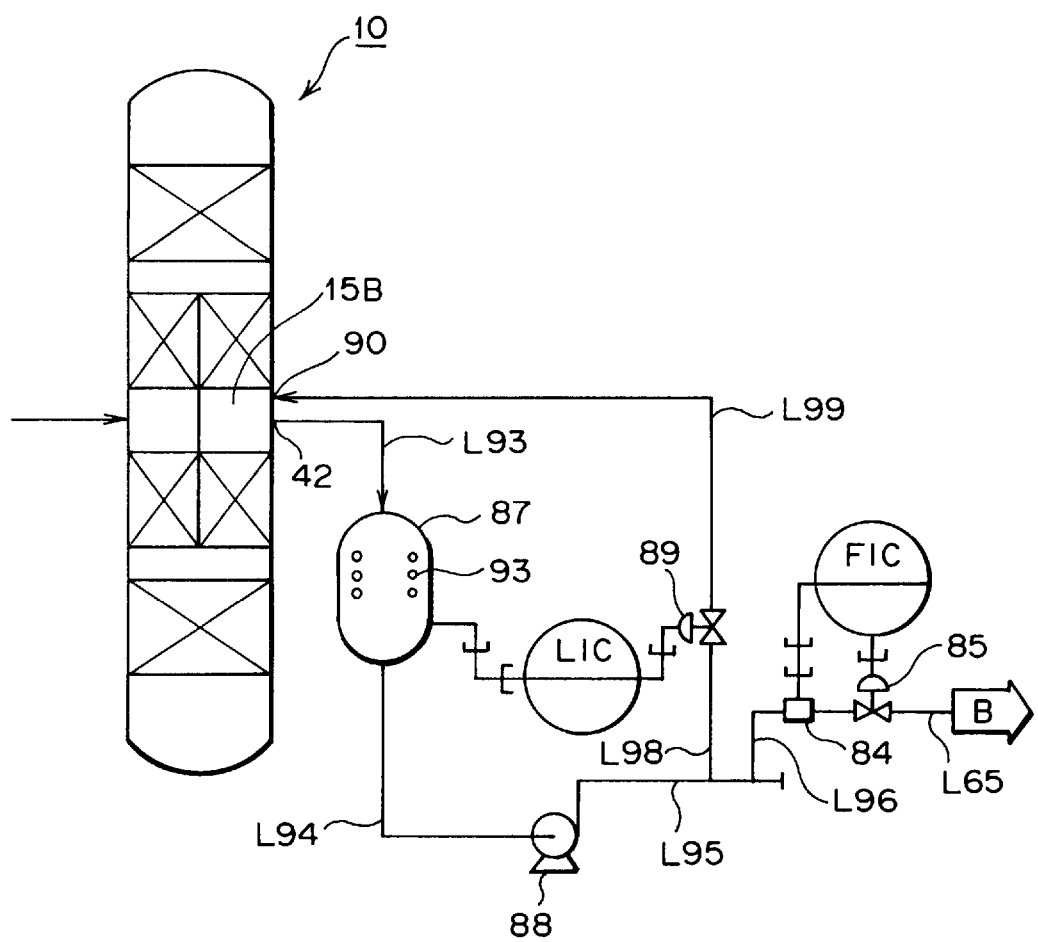
FIG. 23 is a conceptual view of a main portion of a distillation apparatus according to a tenth embodiment of the present invention.

FIG. 23 conceptually shows a main portion of a distillation apparatus according to the tenth embodiment of the present invention.

In this case, liquid rich in component B is discharged as a side cut liquid to a line L93 through the side cut nozzle 42. The side cut liquid is fed to a receiver 87 serving as cooling means and cooled therein. The receiver 87 includes a cooling coil 93, through which cooling water flows.

The side cut liquid cooled in the receiver 87 is fed to a pump 88 through a line L94. A portion of the side cut liquid discharged from the pump 88 is sent under pressure to the flow regulating valve 85 through lines L95 and L96. The remaining side cut liquid discharged from the pump 88 is sent under pressure to a side cut feed inlet 90 through the line L95, a line L98, a flow regulating valve 89, and a line L99 and fed to the second chamber 15B through the side cut feed inlet 90.

According to the sixth through tenth embodiments, vapor rich in component A is discharged to the line L57 through the vapor outlet 43 and is then sent to the condenser 81. However, through disposition of a condenser in the first section of the column body, the condenser and the top of the column body can be directly connected.

The distillation apparatus of the above-described embodiments can separate, through distillation, organic compounds, such as hydrocarbons, alcohols, ketones, esters, fatty acids, phenols, nitrogen compounds, and perfumes. Hydrocarbons include benzene, toluene, xylene, biphenyl, and naphthalene; alcohols include methanol, ethanol, butanol, heptanol, and octanol; ketones include acetone, methyl ethyl ketone, and methyl isobutyl ketone; esters include ethyl acetate, butyl acetate, methyl acetate, and butyl acrylate; fatty acids include acetic acid, and butyric acid; phenols include phenol, cresol, and xylenol; nitrogen compounds include dimethylamine, triethylamine, aniline, pyridine, picoline, and quinoline; and perfumes include methyl anthranilate, methyl benzoate, isoeugenol, ethyl caproate, eugenol, and geraniol.

The distillation apparatus of the above-described embodiments are particularly suited to separate perfumes fats and oils, and fatty acids having a high boiling point and C8–C22 in the number of carbons, under reduced pressure on the job-shop-type production basis.

The present invention is not limited to the above-described embodiments. Numerous modifications and variations of the present invention are possible in light of the spirit of the present invention, and they are not excluded from the scope of the present invention.

What is claimed is:

1. A distillation apparatus comprising:
   (a) a column body;
   (b) a partition for dividing the interior of said column body into a first chamber and a second chamber, which are adjacent to each other;
   (c) a first distillation section having a first enriching section, to which a material liquid is fed through a feed nozzle and which is formed above the feed nozzle; and a first exhaust section formed under the feed nozzle;
   (d) a second distillation section having a second enriching section connected to and formed above an upper end of said first distillation section; and a second exhaust section formed below the upper end and located adjacent to the first enriching section of said first distillation section while being separated from the same by said partition;
   (e) a third distillation section having a third enriching section connected to and formed above a lower end of said first distillation section, and located adjacent to the first exhaust section of said first distillation section while being separated from the same by said partition; and a third exhaust section formed below the lower end;
   (f) a condenser connected to the top of said column body for condensing vapor rich in a low-boiling-point component discharged at the top;
   (g) negative-pressure generation means connected to said condenser for generating a negative pressure to thereby withdraw vent gas from said column body;
   (h) a gas cooler for cooling the vent gas and for separating liquid rich in said low-boiling-point component disposed between said condenser and said negative-pressure generation means;

(i) a first discharge system disposed at the side of said column body for discharging liquid rich in a medium-boiling-point component formed from a high-melting-point material; and (j) a second discharge system disposed at the bottom of said column body for discharging liquid rich in a high-boiling-point component formed from a high-melting-point material, wherein (k) said first discharge system has first solidification prevention means for preventing solidification of the liquid rich in the medium-boiling-point component; and (l) said second discharge system has second solidification prevention means for preventing solidification of the liquid rich in the high-boiling-point component.

2. A distillation apparatus according to claim 1, wherein the first and second solidification prevention means each assume a double-pipe structure comprising an inner pipe and an outer pipe disposed concentrically and in which a heating medium is caused to flow through the space between the inner and outer pipes to thereby prevent solidification of the liquid rich in the medium-boiling-point component and the liquid rich in the high-boiling-point component, as each flows through the inner pipes of the first and second solidification means.

3. A distillation apparatus according to claim 1, wherein the first and second solidification prevention means are each steam tracing comprising a primary pipe and a secondary pipe disposed in parallel and in which a heating medium is caused to flow through the secondary pipe to thereby prevent solidification of the liquid flowing through the primary pipe.

4. A distillation apparatus comprising:

(a) a column body;

(b) a partition for dividing the interior of said column body into a first chamber and a second chamber, which are adjacent to each other;

(c) a first distillation section having a first enriching section, to which a material liquid containing a low-boiling-point component, a medium-boiling-point component, and a high-boiling-point component is fed through a feed nozzle and which is formed above the feed nozzle; and a first exhaust section formed under the feed nozzle;

(d) a second distillation section having a second enriching section connected to and formed above an upper end of said first distillation section; and a second exhaust section formed below the upper end and located adjacent to the first enriching section of said first distillation section while being separated from the same by said partition;

(e) a third distillation section having a third enriching section connected to and formed above a lower end of said first distillation section, and located adjacent to the first exhaust section of said first distillation section while being separated from the same by said partition; and a third exhaust section formed below the lower end;

(f) a condenser connected to the top of said column body for condensing vapor rich in a low-boiling-point component discharged at the top;

(g) a side cut nozzle disposed at the side of said column body for discharging liquid rich in the medium-boiling-point component as a product at the side;

(h) an evaporator disposed at the bottom of said column body for generating vapor through application of heat to liquid rich in a high-boiling-point component discharged at the bottom; and (i) a cooler connected to said side cut nozzle for cooling said product for preventing decomposition of liquid rich in medium-boiling-point component.

5. A distillation apparatus comprising:

(a) a column body;

(b) a partition for dividing the interior of said column body into a first chamber and a second chamber which are adjacent to each other;

(c) a first distillation section having a first enriching section, to which an adjusted material liquid comprising a materiel liquid and an additive component is fed through a feed nozzle and which is formed above the feed nozzle; and a first exhaust section formed under the feed nozzle (d) a second distillation section having a second enriching section connected to and formed above an upper end of said first distillation section; and a second exhaust section formed below the upper end and located adjacent to the first enriching section of said first distillation section while being separated from the same by said partition;

(e) a third distillation section having a third enriching section connected to and formed above a lower end of said first distillation section, and located adjacent to the first exhaust section of said first distillation section while being separated from the same by said partition; and a third exhaust section formed below the lower end;

(f) a condenser disposed at the top of said column body for condensing vapor rich in the additive component into liquid rich in the additive component and to discharge the liquid rich in the additive component as distillate;

(g) a first discharge system disposed at the side of said column body for discharging liquid rich in a low-boiling-point component formed from a high-melting-point material; and (h) a second discharge system disposed at the bottom of said column body for discharging liquid rich in a high-boiling-point component;

(i) a negative-pressure generation means connected to said condenser for generating a negative pressure to thereby withdraw vent gas from said column body; and (j) a gas cooler for cooling the vent gas disposed between said condenser and said negative-pressure generation means; wherein (k) the boiling point of the additive component is lower that that of the low-boiling-point component.

* * * * *